United States Patent
Gong et al.

(10) Patent No.: US 11,405,871 B2
(45) Date of Patent: Aug. 2, 2022

(54) UPLINK CONTROL CHANNEL SENDING METHOD AND APPARATUS

(71) Applicant: Huawei Technologies Co., Ltd., Shenzhen (CN)

(72) Inventors: Zhengwei Gong, Shanghai (CN); Liang Wu, Shanghai (CN); Rong Li, Hangzhou (CN); Hao Sun, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 158 days.

(21) Appl. No.: 16/975,339

(22) PCT Filed: Feb. 22, 2019

(86) PCT No.: PCT/CN2019/075924
§ 371 (c)(1),
(2) Date: Aug. 24, 2020

(87) PCT Pub. No.: WO2019/161789
PCT Pub. Date: Aug. 29, 2019

(65) Prior Publication Data
US 2021/0368451 A1    Nov. 25, 2021

(30) Foreign Application Priority Data

Feb. 24, 2018  (CN) .......................... 201810157560.6

(51) Int. Cl.
*H04W 52/08*  (2009.01)
*H04W 52/14*  (2009.01)
(Continued)

(52) U.S. Cl.
CPC ......... *H04W 52/146* (2013.01); *H04W 52/08* (2013.01); *H04W 52/10* (2013.01);
(Continued)

(58) Field of Classification Search
None
See application file for complete search history.

(56) References Cited

U.S. PATENT DOCUMENTS

2013/0324182 A1*  12/2013  Deng .................. H04W 52/242
                                                         455/522
2014/0169321 A1    6/2014  Imamura et al.
(Continued)

FOREIGN PATENT DOCUMENTS

CN    101998596 A    3/2011
CN    102946632 A    2/2013
(Continued)

OTHER PUBLICATIONS

Catt, "Correction on NR PUCCH Power Control Formula," 3GPP TSG RAN WG1 Meeting #92, Athens, Greece, R1-1801746, total 18 pages, 3rd Generation Partnership Project, Valbonne, France (Feb. 26-Mar. 2, 2018).
(Continued)

*Primary Examiner* — Kodzovi Acolatse
(74) *Attorney, Agent, or Firm* — Leydig, Voit & Mayer, Ltd.

(57) ABSTRACT

This application provides a data sending method and apparatus, and a terminal device. The method includes: determining, by a terminal device, a transmit power based on first information, where the first information includes at least one of the following information: information about a channel coding type of uplink control information in an uplink control channel, information about a length of a check code bit in the uplink control information, information about a quantity of resources occupied by an uplink reference signal in the uplink control channel, information about whether the uplink control channel is sent in a frequency hopping manner, or a transmission format of the uplink control channel; and sending, by the terminal device, the uplink
(Continued)

control channel based on the transmit power, so that communication reliability and accuracy can be improved.

27 Claims, 3 Drawing Sheets

(51) Int. Cl.
*H04W 52/10* (2009.01)
*H04W 52/24* (2009.01)
*H04W 72/12* (2009.01)

(52) U.S. Cl.
CPC ..... *H04W 52/242* (2013.01); *H04W 72/1263* (2013.01); *H04W 72/1284* (2013.01)

(56) References Cited

U.S. PATENT DOCUMENTS

| | | | |
|---|---|---|---|
| 2014/0329555 A1* | 11/2014 | Gao | H04W 52/246 455/522 |
| 2016/0286504 A1 | 9/2016 | He et al. | |
| 2016/0295574 A1* | 10/2016 | Papasakellariou | H04L 1/1607 |
| 2017/0201950 A1* | 7/2017 | Liu | H04W 52/08 |
| 2017/0223566 A1 | 8/2017 | Dinan | |
| 2018/0184418 A1 | 6/2018 | Takeda et al. | |
| 2018/0310298 A1 | 10/2018 | Li et al. | |
| 2019/0239164 A1 | 8/2019 | Ahn et al. | |

FOREIGN PATENT DOCUMENTS

| | | |
|---|---|---|
| CN | 106257856 A | 12/2016 |
| CN | 107613557 A | 1/2018 |
| CN | 107683575 A | 2/2018 |
| CN | 107710837 A | 2/2018 |
| WO | 2016099101 A1 | 6/2016 |
| WO | 2016163759 A1 | 10/2016 |
| WO | 2016208680 A1 | 12/2016 |

OTHER PUBLICATIONS

Qualcomm Incorporated, "Remaining Issues on Power Control for NR," 3GPP TSG RAN WG1 Meeting #92, Athens, Greece, R1-1802847, total 5 pages, 3rd Generation Partnership Project, Valbonne, France (Feb. 26-Mar. 2, 2018).

"Offline summary for AI 7.6.1 NR UL power control in non-CA aspects," 3GPP TSG RAN WG1 Meeting AH 1801, Vancouver, Canada, R1-1801047, pp. 1-3, 3rd Generation Partnership Project, Valbonne, France (Jan. 22-26, 2018).

"Uplink code construction," 3GPP TSG RAN WG1 Meeting NR#3, Nagoya, Japan, R1-1715495, pp. 1-13, 3rd Generation Partnership Project, Valbonne, France (Sep. 18-21, 2017).

"3rd Generation Partnership Project; Technical Specification Group Radio Access Network; NR; Physical layer procedures for control (Release 15)," 3GPP TS 38.213 V15.0.0 , pp. 1-56, 3rd Generation Partnership Project, Valbonne, France (Dec. 2017).

"Remaining details on NR power control in non-CA aspects," 3GPP TSG RAN WG1 Meeting AH 1801, Vancouver, Canada, R1-1800118, pp. 1-19, 3rd Generation Partnership Project, Valbonne, France (Jan. 22-26, 2018).

"Correction on NR PUCCH Power Control Formula",3GPP TSG RAN WG1 Meeting NR Ad Hoc, Vancouver, Canada, R1-1800265, pp. 1-15, 3rd Generation Partnership Project, Valbonne, France (Jan. 22-26, 2018).

* cited by examiner

UPLINK CONTROL CHANNEL SENDING METHOD AND APPARATUS

CROSS-REFERENCE TO RELATED APPLICATIONS

This application is a national stage of International Application No. PCT/CN2019/075924, filed on Feb. 22, 2019, which claims priority to Chinese Patent Application No. 201810157560.6, filed on Feb. 24, 2018. The disclosures of aforementioned patent applications are hereby incorporated by reference in their entireties.

TECHNICAL FIELD

This application relates to the communications field, and more specifically, to an uplink control channel sending method and apparatus and a terminal device.

BACKGROUND

To ensure communication reliability and accuracy, in a process of sending an uplink control channel, a transmit power may be compensated. For example, in a long term evolution (LTE) system, a compensation power may be determined based on the following Formula 1:

$$\Delta_{TF}=10\ \log_{10}(2^{1.25 \cdot T}-1) \quad \text{Formula 1}$$

$\Delta_{TF}$ represents the compensation power, and T represents a bit per resource element (BPRE) corresponding to uplink control information in an uplink control channel. Generally, the bit per resource element is defined as a ratio of a quantity of bits of the uplink control information including a check (Cyclic Redundancy Check, CRC) bit to a total quantity of resource elements corresponding to the uplink control information.

However, in this technology, only the BPRE corresponding to the uplink control information is considered in a process of determining the compensation power. With development of communications technologies, requirements on reliability and accuracy also become more stringent, transmission parameters corresponding to the uplink control channel are more flexible, and different sending parameters have different compensation requirements on a transmit power of the uplink control channel. Therefore, the foregoing fixed power compensation technology based on a single parameter cannot meet requirements on communication reliability and accuracy.

SUMMARY

This application provides a data sending method and apparatus and a terminal device to improve communication reliability and accuracy.

According to a first aspect, an uplink control channel sending method is provided. The method includes: determining, by a terminal device, a transmit power based on first information, where the first information includes at least one of the following information: information about a channel coding type of uplink control information in an uplink control channel, information about a length of a check code bit in the uplink control information, information about a quantity of resources occupied by an uplink reference signal in the uplink control channel, information about whether the uplink control channel is sent in a frequency hopping manner, or a transmission format of the uplink control channel; and sending, by the terminal device, the uplink control channel based on the transmit power.

Transmission of uplink control channels for different first information has different requirements on a signal-to-noise ratio. Therefore, the transmit power is determined based on the first information, and the uplink control channel for the first information is sent based on the determined transmit power, so that a signal-to-noise ratio of a signal received at a receive end meets a demodulation requirement. In this way, communication reliability and accuracy can be improved.

Optionally, the determining, by a terminal device, a transmit power based on first information includes: determining, by the terminal device, the transmit power based on the first information and a bit per resource element BPRE corresponding to the uplink control information.

Determining of the transmit power based on the BPRE of the uplink control information can be compatible with the prior art, improving practicability and an effect of this application.

Optionally, the determining, by the terminal device, the transmit power based on the first information and a BPRE corresponding to the uplink control information includes: determining, by the terminal device, a compensation power based on the first information and the BPRE corresponding to the uplink control information; and determining, by the terminal device, the transmit power based on the compensation power and a preset reference power.

Optionally, the determining, by the terminal device, a compensation power based on the first information and the BPRE corresponding to the uplink control information includes: determining, by the terminal device, the compensation power based on the first information and the BPRE corresponding to the uplink control information and based on the following formula: $\Delta_{TF}=10\ \log_{10}[f(k_1 \cdot T, k_2)]$ where $\Delta_{TF}$ represents the compensation power, T represents the BPRE corresponding to the uplink control information, $k_1$ represents a BPRE compensation coefficient, $k_2$ represents a power compensation coefficient, and $f(k_1 \cdot T, k_2)$ is a preset function that uses T, $k_2$, and $k_1$ as variables.

Optionally, a value of $k_1$ is determined based on the first information.

Optionally, a value of $k_2$ is determined based on the first information.

Alternatively, the value of $k_2$ is a preset value, for example, $k_2=1$.

Optionally, $f(k_1 \cdot T, k_2)=k_2 \cdot (2^{k_1 \cdot T}-1)$ or $f(k_1 \cdot T, k_2)=(2^{k_1 \cdot T}-1)^{k_2}$.

Optionally, the method further includes: obtaining, by the terminal device, a mapping relationship between at least two parameter sets and at least two compensation coefficient sets, where each parameter set includes at least one of a parameter value of a channel coding type, a parameter value a length of a check code bit, a parameter value a quantity of resources occupied by an uplink reference signal, a parameter value a status about whether the uplink control channel is sent in a frequency hopping manner, or a parameter value a transmission format of the uplink control channel, and each compensation coefficient set includes at least one of a value of coefficient $k_2$ or a value of coefficient $k_1$; and determining, by the terminal device based on the mapping relationship, a first compensation coefficient set corresponding to a parameter set to which the first information belongs, and determining a value of a coefficient in the first compensation coefficient set as a value of $k_1$ and/or a value of $k_2$.

Optionally, the method further includes: determining, by the terminal device, a BPRE corresponding to each of at least two parts included in the uplink control information; and determining, by the terminal device based on the BPRE corresponding to each part, the BPRE corresponding to the uplink control information.

According to the uplink control channel sending method in this application, the terminal device determines the BPRE corresponding to each of the at least two parts included in the uplink control information, determines the BPRE of the uplink control information based on the BPRE corresponding to each part, and determines the transmit power of the uplink control information based on the determined BPRE. In this way, the used BPRE can accurately reflect a requirement of a part that is in the uplink control information and that has a relatively high requirement on a transmit power, so that communication reliability and accuracy can be improved.

Optionally, the terminal device determines a largest BPRE in BPREs corresponding to the at least two parts as the BPRE corresponding to the uplink control information.

Optionally, the terminal device determines a smallest BPRE in BPREs corresponding to the at least two parts as the BPRE corresponding to the uplink control information.

Optionally, the terminal device determines a BPRE corresponding to a part having a smallest number value in the at least two parts as the BPRE corresponding to the uplink control information.

Optionally, the terminal device determines a BPRE corresponding to a part having a largest number value in the at least two parts as the BPRE corresponding to the uplink control information.

Optionally, the determining, by the terminal device based on the BPRE corresponding to each part, the BPRE corresponding to the uplink control information includes: receiving, by the terminal device, first indication information sent by a network device, where the first indication information indicates a target part in the at least two parts; and determining, by the terminal device, a BPRE corresponding to the target part as the BPRE corresponding to the uplink control information.

Optionally, the at least two parts include a first part and a second part, the first part includes a first channel state information CSI part, the second part includes a second CSI part, the first CSI part includes at least one of a channel state information reference signal resource indicator, a synchronization signal block information indicator, rank information, layer information, and subband or wideband CQI of a first transport block, and the second CSI part includes at least one of wideband CQI of a second transport block, wideband PMI of the second transport block, subband differential CQI of the second transport block, or subband PMI of the second transport block.

Optionally, the first part further includes a hybrid automatic repeat request feedback HARQ-ACK and/or a scheduling request SR.

The second CSI part includes the wideband CQI and wideband PMI of the second transport block, and the subband differential CQI and subband PMI of the second transport block.

Optionally, the first part further includes feedback information or a scheduling request SR.

According to a second aspect, an uplink control channel sending method is provided. The method includes: determining, by a terminal device based on a bit per resource element BPRE corresponding to each of at least two parts included in uplink control information, a BPRE corresponding to the uplink control information; determining, by the terminal device, a transmit power based on the BPRE corresponding to the uplink control information; and sending, by the terminal device, an uplink control channel based on the transmit power, where the uplink control channel includes the uplink control information.

According to the uplink control channel sending method in this application, the terminal device determines the BPRE corresponding to each of the at least two parts included in the uplink control information, determines the BPRE of the uplink control information based on the BPRE corresponding to each part, and determines the transmit power of the uplink control information based on the determined BPRE. In this way, the used BPRE can accurately reflect a requirement of a part that is in the uplink control information and that has a relatively high requirement on a transmit power, so that communication reliability and accuracy can be improved.

Optionally, the terminal device determines a largest BPRE in BPREs corresponding to the at least two parts as the BPRE corresponding to the uplink control information.

Optionally, the terminal device determines a smallest BPRE in BPREs corresponding to the at least two parts as the BPRE corresponding to the uplink control information.

Optionally, the terminal device determines a BPRE corresponding to a part having a smallest number value in the at least two parts as the BPRE corresponding to the uplink control information.

Optionally, the terminal device determines a BPRE corresponding to a part having a largest number value in the at least two parts as the BPRE corresponding to the uplink control information.

Optionally, the determining, by a terminal device based on a BPRE corresponding to each part, a BPRE corresponding to the uplink control information includes: receiving, by the terminal device, first indication information sent by a network device, where the first indication information indicates a target part in the at least two parts; and determining, by the terminal device, a BPRE corresponding to the target part as the BPRE corresponding to the uplink control information.

Optionally, the at least two parts include a first part and a second part, the first part includes a first channel state information CSI part, the second part includes a second CSI part, the first CSI part includes at least one of a channel state information reference signal resource indicator, a synchronization signal block information indicator, rank information, layer information, subband CQI of a first transport block or wideband CQI of the first transport block, and the second CSI part includes at least one of wideband CQI and wideband PMI of a second transport block, and subband differential CQI of the second transport block or subband PMI of the second transport block.

Optionally, the first part further includes a hybrid automatic repeat request feedback HARQ-ACK and/or a scheduling request SR.

The second CSI part includes the wideband CQI and wideband PMI of the second transport block, and the subband differential CQI and subband PMI of the second transport block.

Optionally, the first part further includes feedback information or a scheduling request SR.

According to a third aspect, an uplink control channel sending apparatus is provided. The apparatus includes units configured to perform the steps of the communication method in the first aspect or the second aspect and the implementations of the first aspect or the second aspect.

In a design, the apparatus is a communications chip. The communications chip may include an input circuit or interface configured to send information or data, and an output circuit or interface configured to receive information or data.

In another design, the apparatus is a terminal device, and the terminal device may include a transmitter configured to send information or data and a receiver configured to receive information or data.

According to a fourth aspect, a terminal device is provided. The terminal device includes a processor and a memory, where the memory is configured to store a computer program, the processor is configured to invoke the computer program from the memory and run the computer program, and a communications device is enabled to perform the communication method in the first aspect or the second aspect and the implementations of the first aspect or the second aspect.

Optionally, there are one or more processors, and there are one or more memories.

Optionally, the memory may be integrated with the processor, or the memory and the processor are separately disposed.

Optionally, the terminal device further includes a transmitter and a receiver.

According to a fifth aspect, a computer program product is provided. The computer program product includes a computer program (which may also be referred to as code or an instruction). When the computer program is run, the computer is enabled to perform the method in any one of possible implementations of the first aspect or the second aspect.

According to a sixth aspect, a computer-readable medium is provided. The computer-readable medium stores a computer program (which may also be referred to as code or an instruction). When the computer program is run on a computer, the computer is enabled to perform the method in any one of possible implementations of the first aspect or the second aspect.

According to a seventh aspect, a chip system is provided. The chip system includes a memory and a processor. The memory is configured to store a computer program, the processor is configured to invoke the computer program from the memory and run the computer program, and a communications device on which the chip system is installed is enabled to perform the method in any one of possible implementations of the first aspect or the second aspect.

The chip system may include an input circuit or interface configured to send information or data, and an output circuit or interface configured to receive information or data.

According to the uplink control channel sending method in this application, the transmit power is determined based on the first information or the transmit power is determined based on the BPRE in the at least two parts of the uplink control information, so that communication reliability and accuracy can be improved.

According to an eighth aspect, a terminal device is provided. The terminal device includes: a processor, configured to determine a transmit power based on first information, where the first information includes at least one of the following information: information about a channel coding type of uplink control information in an uplink control channel, information about a length of a check code bit in the uplink control information, information about a quantity of resources occupied by an uplink reference signal in the uplink control channel, information about whether the uplink control channel is sent in a frequency hopping manner, or a transmission format of the uplink control channel; and a transceiver, configured to send the uplink control channel based on the transmit power.

In a possible design, the processor is specifically configured to determine the transmit power based on the first information and a bit per resource element BPRE corresponding to the uplink control information.

In a possible design, the processor is specifically configured to: determine a compensation power based on the first information and the BPRE corresponding to the uplink control information, and determine the transmit power based on the compensation power and a reference power.

In a possible design, the processor is specifically configured to determine the compensation power based on the first information and the BPRE corresponding to the uplink control information and based on the following formula: $\Delta_{TF}=10 \log_{10}[f(k_1 \cdot T, k_2)]$, where $\Delta_{TF}$ represents the compensation power, T represents the BPRE corresponding to the uplink control information, $k_1$ represents a BPRE compensation coefficient, $k_2$ represents a signal-to-noise ratio compensation coefficient, and $f(k_1 \cdot T, k_2)$ is a preset function that uses T, $k_2$, and $k_1$ as variables; and a value of $k_1$ is determined based on the first information; and/or a value of $k_2$ is determined based on the first information.

In a possible design, the processor is specifically configured to: determine, based on mapping relationship information, a first compensation coefficient set corresponding to a parameter set to which the first information belongs, and determine a value of a coefficient in the first compensation coefficient set as a value of $k_1$ and/or a value of $k_2$, where the mapping relationship information indicates a mapping relationship between at least two parameter sets and at least two compensation coefficient sets, where each parameter set includes at least one of a parameter value of a channel coding type, a parameter value of a length of a check code bit, a parameter value of a quantity of resources occupied by an uplink reference signal, a parameter value of a status about whether the uplink control channel is sent in a frequency hopping manner, and a parameter value of a transmission format of the uplink control channel; and each compensation coefficient set includes at least one of a value of coefficient $k_1$ or a value of coefficient $k_2$.

In a possible design, the processor is specifically configured to determine, based on a BPRE corresponding to at least one of at least two parts included in the uplink control information, a BPRE corresponding to the uplink control information.

In a possible design, the processor is specifically configured to determine a largest BPRE in BPREs corresponding to the at least two parts as the BPRE corresponding to the uplink control information; or the processor is specifically configured to determine a smallest BPRE in BPREs corresponding to the at least two parts as the BPRE corresponding to the uplink control information; or the processor is specifically configured to determine a BPRE corresponding to a part having a smallest number value in the at least two parts as the BPRE corresponding to the uplink control information; or the processor is specifically configured to determine a BPRE corresponding to a part having a largest number value in the at least two parts as the BPRE corresponding to the uplink control information.

In a possible design, the transceiver is further configured to receive first indication information sent by a network device, where the first indication information indicates a target part in the at least two parts; and the processor is further configured to determine a BPRE corresponding to the target part as the BPRE corresponding to the uplink control information.

DESCRIPTION OF EMBODIMENTS

Figure 1:
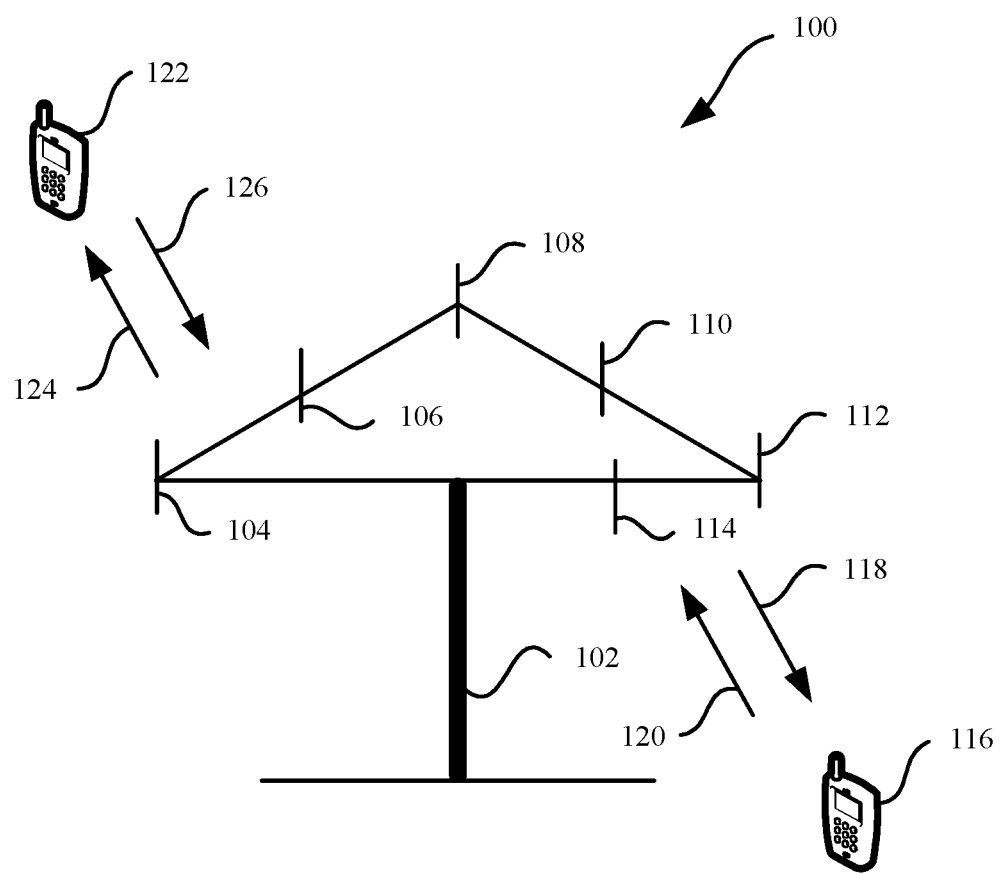
FIG. 1 is a schematic structural diagram of an example of a communications system according to this application.

The following describes technical solutions of this application with reference to accompanying drawings.

The technical solutions of the embodiments of this application may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future 5th generation (5G) system, or a new radio (NR) system.

As an example rather than a limitation, in the embodiments of this application, a terminal device may also be referred to as a user equipment (UE), an access terminal, a subscriber unit, a subscriber station, a mobile station, a mobile console, a remote station, a remote terminal, a mobile device, a user terminal, a terminal, a wireless communications device, a user agent, or a user apparatus. The terminal device may be a station (ST) in a WLAN, or may be a cellular phone, a cordless phone, a session initiation protocol (SIP) phone, a wireless local loop (WLL) station, a personal digital assistant (PDA) device, a handheld device or computing device having a wireless communication function, another processing device connected to a wireless modem, a vehicle-mounted device, a wearable device, and a terminal device in a next-generation communications system, for example, a terminal device in a 5G network or a terminal device in a future evolved public land mobile network (PLMN).

As an example rather than a limitation, in the embodiments of this application, the terminal device may alternatively be a wearable device. The wearable device may also be referred to as a wearable intelligent device, and is a generic name of wearable devices developed by intelligently designing daily wear by using a wearable technology, such as glasses, gloves, a watch, clothing, or shoes. A wearable device is a portable device that can be directly worn on a body or integrated into clothes or an accessory of a user. The wearable device is not merely a hardware device, and further implements powerful functions by software support, data exchange, and cloud interaction. Generalized wearable intelligent devices include full-featured and large-size devices that can implement complete or partial functions without depending on smartphones, such as smart watches or smart glasses, and devices that focus only on one type of application function and need to work with other devices such as smartphones, such as various smart bands or smart jewelry for monitoring physical signs.

In addition, in the embodiments of this application, the terminal device may alternatively be a terminal device in an internet of things (IoT) system. IoT is an important part of information technology development in the future, and has a main technical feature in which things are connected to a network by using a communications technology to implement an intelligent network with human-machine and thing-thing interconnections.

In the embodiments of this application, an IoT technology may implement massive connections, deep coverage, and terminal power saving by using, for example, a narrowband (Narrow Band) NB technology. For example, an NB includes only one resource block (RB), that is, a bandwidth of the NB is only 180 KB. To implement massive access, terminals need to be discrete in access. According to a communication method in the embodiments of this application, a congestion problem that occurs in the IoT technology when massive terminals access a network by using the NB can be effectively resolved.

In the embodiments of this application, a receiver of data sent by the terminal device may be, for example, an access network device. The access network device may be an access point (AP) in a WLAN or a base transceiver station (BTS) in GSM or CDMA, may be a NodeB (NB) in WCDMA or a gNB in a new radio (NR) system, or may be an evolved NodeB (eNB or eNodeB) in LTE, a relay station, an access point, a vehicle-mounted device, a wearable device, an access network device in a future 5G network, an access network device in a future evolved PLMN network, or the like.

Furthermore, in the embodiments of this application, the access network device provides a service for a cell, and the terminal device communicates with the access network device by using a transmission resource (for example, a frequency domain resource, in other words, a spectrum resource) used in the cell. The cell may be a cell corresponding to the access network device (for example, a base station). The cell may belong to a macro base station or may belong to a base station corresponding to a small cell. The small cell herein may include a metro cell, a micro cell, a pico cell, a femto cell, and the like. These small cells are characterized by a small coverage, a low transmit power, and the like, and are suitable to provide a high-rate data transmission service.

In addition, in an LTE system or a 5G system, a plurality of cells may simultaneously work on a carrier on a same frequency. In some special scenarios, it may be considered that a concept of the carrier is equivalent to a concept of a cell. For example, in a carrier aggregation (CA) scenario, when a secondary component carrier is configured for a UE, both a carrier index of the secondary component carrier and a cell identifier (Cell ID) of a secondary serving cell working on the secondary component carrier are carried. In this case, the concepts of the carrier and the cell may be considered to be equivalent. For example, that the UE accesses a carrier is equivalent to that the UE accesses a cell.

In the embodiments of this application, a receiver of data sent by the terminal device may be, for example, a core network device. The core network device may be connected to a plurality of access network devices, to control the access network devices, and may distribute, to the access network devices, the data received from a network side (for example, the Internet).

The foregoing listed functions and specific implementations of the terminal device, the access network device, and the core network device are merely examples for description, and this application is not limited thereto.

In the embodiments of this application, the terminal device or the network device includes a hardware layer, an operating system layer running above the hardware layer, and an application layer running above the operating system layer. The hardware layer includes hardware such as a central processing unit (CPU), a memory management unit (MMU), and a memory (also referred to as a main memory). The operating system may be any one or more computer operating systems that implement service processing by using a process, for example, a Linux operating system, a UNIX operating system, an Android operating system, an iOS operating system, or a Windows operating system. The application layer includes applications such as a browser, an address book, word processing software, and instant communications software. In addition, the embodiments of this application do not particularly limit a specific structure of an execution body of the methods provided in the embodiments of this application, provided that a program recording code of the methods provided in the embodiments of this application can be run to perform communication according to the methods provided in the embodiments of this application. For example, the methods provided in the embodiments of this application may be performed by a terminal device or a network device, or may be a function module capable of invoking and executing a program in the terminal device or the network device.

In addition, aspects or features in the embodiments of this application may be implemented as a method, an apparatus, or a product that uses standard programming and/or engineering technologies. The term "product" used in this application covers a computer program that can be accessed from any computer-readable device, carrier, or medium. For example, the computer-readable medium may include but is not limited to a magnetic storage component (for example, a hard disk, a floppy disk, or a magnetic tape), an optical disc (for example, a compact disc (CD), or a digital versatile disc (DVD)), a smartcard, and a flash memory component (for example, an erasable programmable read-only memory (EPROM), a card, a stick, or a key drive). In addition, various storage media described in this specification may represent one or more devices and/or other machine-readable media that are configured to store information. The term "machine-readable media" may include but is not limited to a wireless channel and various other media that can store, include, and/or carry an instruction and/or data.

It should be noted that in the embodiments of this application, a plurality of application programs may be run at the application layer. In this case, an application program for performing the communication methods in the embodiments of this application and an application program configured to control a receive end device to implement an action corresponding to received data may be different application programs.

FIG. 1 is a schematic diagram of a system 100 applicable to a communication method according an embodiment of this application. As shown in FIG. 1, the system 100 includes an access network device 102. The access network device 102 may include one or more antennas, for example, antennas 104, 106, 108, 110, 112, and 114. In addition, the access network device 102 may further include a transmitter chain and a receiver chain. A person of ordinary skill in the art can understand that the transmitter chain and the receiver chain each may include a plurality of components related to signal sending and receiving (for example, a processor, a modulator, a multiplexer, a demodulator, a demultiplexer, or an antenna).

The access network device 102 may communicate with a plurality of terminal devices (for example, a terminal device 116 and a terminal device 122). However, it may be understood that the access network device 102 may communicate with any quantity of terminal devices that are similar to the terminal device 116 or the terminal device 122. For example, the terminal devices 116 and 122 may be a cellular phone, a smartphone, a portable computer, a handheld communications device, a handheld computing device, a satellite radio apparatus, a global positioning system, a PDA, and/or any other proper device configured to perform communication in the wireless communications system 100.

As shown in FIG. 1, the terminal device 116 communicates with the antennas 112 and 114. The antennas 112 and 114 send information to the terminal device 116 over a forward link (also referred to as a downlink) 118, and receive information from the terminal device 116 over a reverse link (also referred to as an uplink) 120. In addition, the terminal device 122 communicates with the antennas 104 and 106. The antennas 104 and 106 send information to the terminal device 122 over a forward link 124, and receive information from the terminal device 122 over a reverse link 126.

For example, in a frequency division duplex (FDD) system, the forward link 118 may use a frequency band different from that used by the reverse link 120, and the forward link 124 may use a frequency band different from that used by the reverse link 126.

For another example, in a time division duplex (TDD) system and a full duplex system, the forward link 118 and the reverse link 120 may use a same frequency band, and the forward link 124 and the reverse link 126 may use a same frequency band.

Each antenna (or an antenna group including a plurality of antennas) and/or an area designed for communication are/is referred to as a sector of the access network device 102. For example, an antenna group may be designed to communicate with a terminal device in a sector within a coverage area of the access network device 102. The access network device may send signals to all terminal devices in a corresponding sector by using a single antenna or a multi-antenna transmit diversity. In a process in which the access network device 102 communicates with the terminal devices 116 and 122 respectively over the forward links 118 and 124, a transmit antenna of the access network device 102 may improve signal-to-noise ratios of the forward links 118 and 124 by beamforming. In addition, compared with a manner in which an access network device uses a single-antenna or a multi-antenna transmit diversity to transmit signals to all terminal devices served by the access network device, when the access network device 102 uses beamforming to transmit signals to the terminal devices 116 and 122 that are randomly scattered in a related coverage area, interference to a mobile device in a neighboring cell is less.

In a given time, the access network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a specific quantity of data bits that need to be sent to the wireless communications receiving apparatus through a channel. The data bits may be included in a transport block (or a plurality of transport blocks) of data, and the transport block may be segmented to generate a plurality of code blocks.

In addition, the communications system 100 may be a PLMN network, a D2D network, an M2M network, an IoT network, or another network. FIG. 1 is merely a simplified schematic diagram of an example. The network may further include another access network device, which is not drawn in FIG. 1.

A network device may be a network device in the network, a network device in a future evolved PLMN network, or the like is not limited in this embodiment of this application.

A resource used in the communications system 100 for wireless communication is described in detail below.

In this embodiment of this application, the wireless communications resource may include a plurality of dimensions such as a time domain, a frequency domain, a space domain, and a code domain.

For example, in this application, the resource may be divided into a plurality of time units in time domain.

In addition, in this embodiment of this application, the plurality of time units may be consecutive, or preset intervals may be set between some adjacent time units. This is not particularly limited in this embodiment of this application.

In this embodiment of this application, the time unit may be a time unit used for at least one of uplink information (for example, uplink control information) transmission and sidelink link information (for example, data on a sidelink) transmission.

In this embodiment of this application, a length of one time unit may be randomly set, and is not particularly limited in this embodiment of this application.

For example, one time unit may include one or more subframes.

Alternatively, one time unit may include one or more timeslots.

Alternatively, one time unit may include one or more symbols.

Alternatively, one time unit may include one or more transmission time intervals (TTIs).

Alternatively, one time unit may include one or more transmission periods (TPs).

For another example, in this application, resources may be divided into a plurality of carriers or a plurality of frequency bands in frequency domain.

In addition, each carrier or frequency band may be divided into a plurality of subcarriers.

A time-frequency resource uniquely determined by one subcarrier and one symbol may be referred to as a resource element (RE), and a plurality of REs within a specified time-frequency range and a specified frequency domain range may form a resource block (RB).

In other words, in this embodiment of this application, a "position of the time-frequency resource" may be a time domain position and/or a frequency domain position of the time-frequency resource.

In this embodiment of this application, physical uplink control channel (PUCCH) may be used to carry uplink control information (UCI).

As an example rather than a limitation, in this embodiment of this application, the uplink control information may include but is not limited to one or more of the following information:

1. Feedback Information

In this embodiment of this application, the uplink control information may include feedback information for downlink data.

Specifically, in this embodiment of this application, a feedback technology may be used for downlink data transmission. As an example rather than a limitation, the feedback technology may include, for example, a hybrid automatic repeat request (HARQ) technology.

The HARQ technology is a technology that combines forward error correction (FEC) coding and an automatic repeat request (ARQ).

For example, in the HARQ technology, after receiving data from a transmit end, a receive end may determine whether the data is accurately decoded. If the data cannot be accurately decoded, the receive end may feed back negative acknowledge (NACK) information to the transmit end, so that the transmit end can determine, based on the NACK information, that the receive end does not accurately receive the data, and therefore can perform retransmission. If the data can be accurately decoded, the receive end may feed back acknowledge (ACK) information to the transmit end, so that the transmit end can determine, based on the ACK information, that the receive end accurately receives the data, and therefore can determine that the data transmission is completed.

In other words, in this embodiment of this application, when decoding succeeds, the receive end may feed back the ACK information to the transmit end; when decoding fails, the receive end may feed back the NACK information to the transmit end.

As an example rather than a limitation, in this embodiment of this application, the uplink control information may include the ACK information or the NACK information in the HARQ technology.

It should be understood that content included in the feedback information listed above is merely an example for description, and this application is not limited thereto. Other information that can indicate a status of receiving downlink data by the terminal device shall fall within the protection scope of this application. For example, the feedback information may further include discontinuous transmission (DTX) information, and the DTX information may be used to indicate that the terminal device receives no downlink data.

2. Channel State Information (CSI)

In the field of wireless communications, the CSI is a channel attribute of a communications link. The CSI describes a fading factor of a signal on each transmission path, that is, a value of each element in a channel gain matrix H, such as signal scattering, environment fading (fading, multipath fading or shadowing fading), power decay of distance, and other information. The CSI may enable a communications system to adapt to a current channel condition, thereby providing assurance for high-reliability and high-rate communication in a multi-antenna system.

In this embodiment of this application, the CSI may include two parts: a CSI part 1 and a CSI part 2.

The CSI part 1 may include at least one type of the following uplink control information: a channel state information reference signal resource indicator (CRI), synchronization signal block information indicator (SSBI) rank information (Rank Indicator, RI), layer information (Layer Indicator, LI), subband or wideband channel quality indicator (CQI) of a first transport block (TB), and the like.

The CSI part 2 includes wideband CQI and wideband precoding matrix indicator (PMI) of a second TB, and subband differential CQI and subband PMI of the second TB.

If the CSI has only one part, at least one type of uplink control information in the CS1 part 1 and the CSI part 2 may be included.

3. Channel Quality Indicator (CQI) Information

In this embodiment of this application, the CQI may be used to reflect channel quality of a physical downlink shared channel (PDSCH). As an example rather than a limitation, in this embodiment of this application, 0 to 15 may be used to indicate channel quality of a PDSCH. 0 indicates that the channel quality is the worst, and 15 indicates that the channel quality is the best.

In this embodiment of this application, the terminal device may send CQI information to the network device on a physical uplink control channel (PUCCH) or a physical uplink shared channel (PUSCH). The network device may determine a wireless channel condition of a current PDSCH or PUSCH based on the CQI information, to complete scheduling for the PDSCH. For example, in this embodiment of this application, the network device may determine adaptive modulation and coding (AMC), a modulation and coding scheme (MCS), a bit rate or an amount of data of uplink transmission or downlink transmission, or the like based on the CQI information.

4. Rank Indicator (Rank Indication, RI) Information

In this embodiment of this application, the RI information may be used to indicate a quantity of valid data layers of the PDSCH, or the RI information may be used to indicate a quantity of code words (Code Word, CW) that can be currently supported by the terminal device.

5. Precoding Matrix Indicator (PMI) Information

In this embodiment of this application, the PMI information may be used to indicate an index of a codebook set. That is, in a multi-antenna technology such as a multiple-input multiple-output (MIMO) technology, precoding processing (precoding) based on a precoding matrix is performed in baseband processing at a PDSCH physical layer. The terminal device may indicate the precoding matrix by using the PMI information, so that signal quality of a PDSCH can be improved.

In this embodiment of this application, sending an uplink control channel may be sending data or information carried on the uplink control channel. The data or information may be data or information obtained after channel coding.

Optionally, in this embodiment of this application, the uplink control channel may be further used to carry an uplink reference signal (demodulation reference signal, DMRS).

Figure 2:
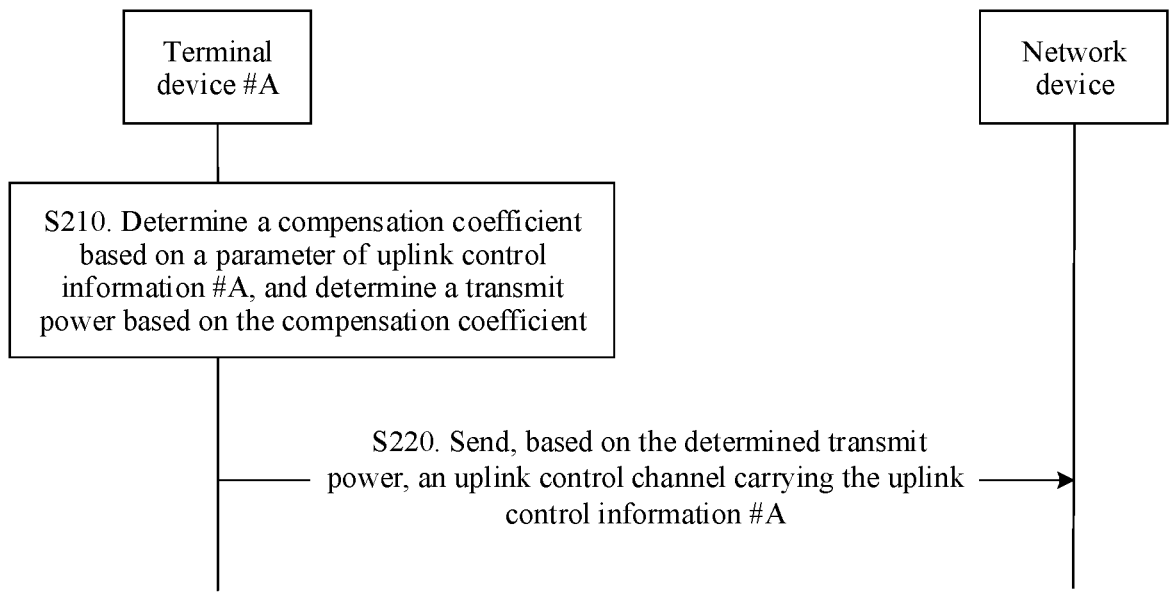
FIG. 2 is a schematic interaction diagram of an example of an uplink control channel sending method according to this application.

The following describes in detail a specific procedure of a data sending method 200 according to an embodiment of this application with reference to FIG. 2.

As shown in FIG. 2, in S210, a terminal device #A (namely, an example of the terminal device) may determine a transmit power #A (namely, an example of the transmit power) for sending uplink control information #A (namely, an example of the uplink control information).

When determining the transmit power #A, the terminal device #A may use at least one of the following parameters.

Parameter 1: A Channel Coding Type of the Uplink Control Information #A

Specifically, because interference and fading exist in mobile communication, an error occurs in a signal transmission process. Therefore, an error detection and correction technology, that is, an error detection and correction coding technology, needs to be used for a digital signal, to enhance a capability of resisting various interference during data transmission on a channel, and improve system reliability. Error detection and correction coding performed on a digital signal to be transmitted on a channel is channel coding.

As an example rather than a limitation, in this embodiment of this application, the following channel coding types may be listed:

1. RM Code

A Reed-Muller (RM) code is a linear combination coding manner. That is, K pieces of information are respectively multiplied by K base sequences of N×1, then products are added to obtain a comprehensive sequence, and a modulo-2 operation is performed on each element of the comprehensive sequence to obtain a final N×1 coding output sequence. A formula may be expressed as:

$$d_i = \left(\sum_{k=0}^{K-1} c_k \cdot M_{i,k}\right) \bmod 2,$$

where d is an output coding output sequence, i=0, 1, . . . , N-1, N=32, N is a length of a coding output sequence, $M_{i,k}$ represents an $i^{th}$ element of a $k^{th}$ base sequence, and the base sequence may be provided in the following Table 1, where k=0, 1, . . . , or K-1, and ck is a $k^{th}$ piece of to-be-encoded information.

TABLE 1

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 0 | 1 | 1 | 0 | 0 | 0 | 0 | 0 | 0 | 0 | 0 | 1 |
| 1 | 1 | 1 | 1 | 0 | 0 | 0 | 0 | 0 | 0 | 1 | 1 |
| 2 | 1 | 0 | 0 | 1 | 0 | 0 | 1 | 0 | 1 | 1 | 1 |
| 3 | 1 | 0 | 1 | 1 | 0 | 0 | 0 | 0 | 1 | 0 | 1 |
| 4 | 1 | 1 | 1 | 1 | 0 | 0 | 0 | 1 | 0 | 0 | 1 |
| 5 | 1 | 1 | 0 | 0 | 1 | 0 | 1 | 1 | 1 | 0 | 1 |
| 6 | 1 | 0 | 1 | 0 | 1 | 0 | 1 | 0 | 1 | 1 | 1 |
| 7 | 1 | 0 | 0 | 1 | 1 | 0 | 0 | 1 | 1 | 0 | 1 |
| 8 | 1 | 1 | 0 | 1 | 1 | 0 | 0 | 1 | 0 | 1 | 1 |
| 9 | 1 | 0 | 1 | 1 | 1 | 0 | 1 | 0 | 0 | 1 | 1 |
| 10 | 1 | 0 | 1 | 0 | 0 | 1 | 1 | 1 | 0 | 1 | 1 |
| 11 | 1 | 1 | 1 | 0 | 0 | 1 | 1 | 0 | 1 | 0 | 1 |
| 12 | 1 | 0 | 0 | 1 | 0 | 1 | 0 | 1 | 1 | 1 | 1 |
| 13 | 1 | 1 | 0 | 1 | 0 | 1 | 0 | 1 | 0 | 1 | 1 |
| 14 | 1 | 0 | 0 | 0 | 1 | 1 | 0 | 1 | 0 | 0 | 1 |
| 15 | 1 | 1 | 0 | 0 | 1 | 1 | 1 | 1 | 0 | 1 | 1 |

TABLE 1-continued

| i | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ |
|---|---|---|---|---|---|---|---|---|---|---|---|
| 16 | 1 | 1 | 1 | 0 | 1 | 1 | 1 | 0 | 0 | 1 | 0 |
| 17 | 1 | 0 | 0 | 1 | 1 | 1 | 0 | 0 | 1 | 0 | 0 |
| 18 | 1 | 1 | 0 | 1 | 1 | 1 | 1 | 1 | 0 | 0 | 0 |
| 19 | 1 | 0 | 0 | 0 | 0 | 1 | 1 | 0 | 0 | 0 | 0 |
| 20 | 1 | 0 | 1 | 0 | 0 | 0 | 1 | 0 | 0 | 0 | 1 |
| 21 | 1 | 1 | 0 | 1 | 0 | 0 | 0 | 0 | 0 | 1 | 1 |
| 22 | 1 | 0 | 0 | 0 | 1 | 0 | 0 | 1 | 1 | 0 | 1 |
| 23 | 1 | 1 | 1 | 0 | 1 | 0 | 0 | 1 | 1 | 1 | 0 |
| 24 | 1 | 1 | 1 | 1 | 1 | 0 | 1 | 1 | 1 | 1 | 0 |
| 25 | 1 | 1 | 0 | 0 | 0 | 1 | 1 | 1 | 0 | 0 | 1 |
| 26 | 1 | 0 | 1 | 1 | 0 | 1 | 0 | 0 | 1 | 1 | 0 |
| 27 | 1 | 1 | 1 | 1 | 0 | 1 | 0 | 1 | 1 | 1 | 0 |
| 28 | 1 | 0 | 1 | 0 | 1 | 1 | 1 | 0 | 1 | 0 | 0 |
| 29 | 1 | 0 | 1 | 1 | 1 | 1 | 1 | 1 | 1 | 0 | 0 |
| 30 | 1 | 1 | 1 | 1 | 1 | 1 | 1 | 1 | 1 | 1 | 1 |
| 31 | 1 | 0 | 0 | 0 | 0 | 0 | 0 | 0 | 0 | 0 | 0 |

2. Convolutional Code

A convolutional code is encoding k information bits into n bits. However, k and n are usually very small. The convolutional code is particularly suitable for transmission in serial mode, and has a low latency. If (n, k, m) is used to describe a convolutional code, where k is a quantity of bits input into a convolutional encoder each time, n is an n-tuple codeword output by a convolutional code corresponding to each k-tuple codeword, and m is a coding storage degree, that is, a quantity of stages of a k tuple of the convolutional encoder, m+1=K is referred to as a coding constraint degree, and m is referred to as a constraint length. The convolutional code is encoding an input code element of a k tuple into an output code element of an n tuple. However, k and n are usually very small. The convolutional code is particularly suitable for transmission in serial mode, and has a low latency. Different from a block code, an n tuple element generated by convolutional code encoding is not only related to a currently input k tuple, but also related to previous m−1 input k tuples. A quantity of code elements associated with each other in an encoding process is n*m. Error correction performance of the convolutional code increases as m increases, while an error rate exponentially decreases as N increases. Performance of the convolutional code is better than that of the block code in case of same encoder complexity.

3. Turbo Code

A turbo code is a concatenated code. A basic principle is that an encoder performs parallel concatenation on two component encoders by using an interleaver, and the two component encoders separately output a corresponding check bit; a decoder performs iterative decoding between two component decoders, and transfers, between the component decoders, extrinsic information from which a positive feedback is removed. In this way, an entire decoding process is similar to turbo working. Therefore, the encoding method is also visually referred to as a turbo code. The turbo code tactfully uses two simple component codes by means of parallel concatenation of a pseudo-random interleaver to construct a pseudo-random long code, and performs a plurality of iterations between two soft-input/soft-output (SISO) decoders, thereby implementing pseudo random decoding.

4. Polar Code

A polar code is a new coding manner that can implement a code construction method of a capacity of a symmetric binary input discrete memoryless channel (for example, a binary symmetric channel (BSC) and a binary erasure channel (BEC)).

In a communications system, channel coding is usually used to improve data transmission reliability to ensure communication quality. The polar code proposed by Arikan is a first good code that is theoretically proved to be able to achieve a Shannon capacity and has low coding and decoding complexity.

The polar code is a linear block code. A generator matrix of the polar code is $G_N$, and an encoding process is $x_1^N = u_1^N G_N$.

$x_1^N$ is a mother code of the polar code, and is a binary row vector having a length of N and having an element of a mother codeword.

$u_1^N = (u_1, u_2, \ldots, u_N)$ is a binary row vector having a length of N (namely, a code length) and having a value of an integer power of 2.

$G_N$ is a matrix of N×N, and $G_N = B_N F_2^{\otimes(log_2(N))}$. Herein, $$F_2 = \begin{bmatrix} 1 & 0 \\ 1 & 1 \end{bmatrix},$$

and $B_N$ is a transposed matrix of N×N, for example, a bit-reversal permutation (Bit ReveRMal) matrix. The bit-reversal permutation is obtaining $y_1^N$ after a sequence $x_1^N$ having a length of N is arranged, where $y_a = x_b$, and binary representation of sequence numbers a and b are the reverse of each other. For example, (1,5,3,7,2,6,4,8) is obtained after bit-reversal permutation is performed on a sequence (1,2,3,4,5,6,7,8).

$F_2^{\otimes(log_2(N))}$ is defined as a Kronecker product of $log_2$ N matrices $F_2$.

The foregoing addition and multiplication operations are all addition and multiplication operations in a binary Galois field.

In a polar code coding process, some bits in $u_1^N$ are used to carry information, and are referred to as information bits. A set of indexes of these bits is denoted as A. Some other bits are set to fixed values agreed on in advance by a receive end and a transmit end and are referred to as fixed bits. A set of indexes of the fixed bits is denoted as a complementary set $A^c$ of A. Without loss of generality, these fixed bits are usually set to 0, and this setting is also used in descriptions of this application. However, actually, a fixed bit sequence may be randomly set, provided that the fixed bit sequence is agreed on in advance by the receive end and the transmit end.

When the fixed bits are set to 0, coding output of the polar code may be simplified as: $x_1^N = u_A G_N(\mathcal{A})$, where $u_A$ is a set of information bits in $u_1^N$, $u_A$ is a row vector having a length of K bits, that is, $|A|=K$, where $|\cdot|$ represents a quantity of elements in a set, K is a size of an information block, $G_N(\mathcal{A})$ is a sub-matrix that is in the matrix $G_N$ and that is obtained by using rows corresponding to the indexes in the set A, and $G_N(\mathcal{A})$ is a matrix of K×N. Selection of the set A determines performance of the polar code.

The most basic decoding method of the polar code is SC decoding. In an SC decoding algorithm, bits in $u_1^N$ are decoded one by one by using a signal sequence $y_1^N$ received from a channel, to obtain an estimated sequence $\hat{u}_1^N$ of $u_1^N$.

The following decoding decisions are made one by one for an index i from 1 to N:

$$\hat{u}_i = \begin{cases} h(u_1^N, y_1^N) & \text{if } i \in A \\ 0 & \text{if } i \in A^c \end{cases}, \text{where}$$

$$h(u_1^M, y_1^M) = \begin{cases} 0 & \text{if } W_N^{(i)}(y_1^i, \hat{u}_1^{i-1} \mid \hat{u}_i = 0) \geq W_N^{(i)}(y_1^i, \hat{u}_1^{i-1} \mid \hat{u}_i - 1) \\ 1 & \text{if } W_N^{(i)}(y_1^i, \hat{u}_1^{i-1} \mid \hat{u}_i = 0) < W_N^{(i)}(y_1^i, \hat{u}_1^{i-1} \mid \hat{u}_i - 1) \end{cases}$$

In the foregoing formula, $W_N^{(i)}(y_1^i, u_1^{i-1} \mid u_i)$ is a channel transition probability function of a polar channel corresponding to a bit $u_i$. The transition probability function $W_N^{(i)}(y_1^i, u_1^{i-1} \mid u_i)$ of the polar channel is obtained according to a transition probability function $W(y|x)$ of an original channel used to transmit an encoded bit and according to the following formula:

$$W_N^{(i)}(y_1^i, u_1^{i-1} \mid u_i) = \sum_{u_{N+1}^N \in \{0,1\}^{N-i}} \prod_{k=1}^N W(y_k \mid x_k)$$

As described above, a correspondence between $x_1^N$ and $u_1^N$ is $x_1^N = u_1^N G_N$, and $\{0,1\}^{N-i}$ represents a Cartesian product of N−i sets {0,1}.

The SC decoding has the following advantages: 1) When a code length is sufficiently large, it is theoretically proved that the polar code can reach a channel capacity in SC decoding; 2) decoding complexity is very low, is in a linear relationship with a product of the code length N and a logarithm $\log_2 N$ of the code length, and is $O(N \log_2 N)$.

When the code length is relatively short, performance of conventional successive cancellation (SC) decoding is not ideal, and the performance is worse than that of a low-density parity-check (LDPC) code or a turbo code that has been widely used at present. Enhanced SC decoding algorithms (further including SCS decoding, SCH decoding, and the like) represented by an SCL decoding algorithm are successively proposed. When the information sequence includes CRC information (HARQ transmission is such a scenario), by means of CRC-aided enhanced SC decoding, such as CRC-aided SCL (CRC-Aided Successive Cancellation List, CASCL) decoding, CRC-aided SCS (CRC-Aided Successive Cancellation Stack, CASCS) decoding, and CRC-aided SCH (CRC-Aided Successive Cancellation Hybrid, CASCH) decoding, the polar code can obtain FER performance that is the same as or even better than that of a turbo code or an LDPC code when decoding complexity is the same. Therefore, the polar code has a very good application prospect in a future communications system.

It can be learned from the coding matrix that a code length of an original polar code (mother code) is an integral power of 2, and a polar code with any code length needs to be implemented by rate matching in actual application.

It should be understood that the channel coding types listed above are merely examples for description, and this application is not limited thereto. Other coding types that can be used for channel coding shall fall within the protection scope of this application. For example, the channel coding types in this embodiment of this application may further include tail-biting convolutional code (TBCC) coding, low-density parity-check (LDPC) code coding, and the like.

As an example rather than a limitation, a transmit power when an RM code is used is set to a power #a1, a transmit power when a convolutional code is used is set to a power #b1, a transmit power when a turbo code is used is set to a power #c1, and a transmit power when a polar code is used is set to a power #d1. Therefore, when transmission parameters (for example, a length of a check code bit in uplink control information, a quantity of resources occupied by an uplink reference signal in an uplink control channel, a status about whether the uplink control channel is sent in a frequency hopping manner, and a transmission format of the uplink control channel) other than the coding type are the same or similar, the power #a1, the power #b1, the power #c1, and the power #d1 may have the following relationship:

When same uplink control information A is sent, different coding gains may be obtained by using different channel coding types. Therefore, in a case of a same error probability requirement, different channel coding types correspond to different demodulation threshold requirements. Further, requirements on a transmit power are different. Without loss of generality, the power #a1, the power #b1, the power #c1, and the power #d1 may be in descending order. That is, power #a1>power #b1>power #c1>power #d1.

Parameter 2: A Length of a Check Code Bit in the Uplink Control Information #A

In this embodiment of this application, the terminal device may add a cyclic redundancy check code (Cyclic Redundancy Check, CRC) to the uplink control information in a channel coding process. In this case, as an example rather than a limitation, a length of a CRC check code bit (which may alternatively be referred to as a check bit) may be, for example, 6 or 11.

Alternatively, the terminal device may not add the CRC check code. In this case, a length of a bit of the CRC check code may be 0.

As an example rather than a limitation, a transmit power when a length of a CRC-scrambled bit is 0 is set to a power #a2, a transmit power when the length of the CRC-scrambled bit is 6 is set to a power #b2, and a transmit power when the length of the CRC-scrambled bit is 11 is set to a power #c2. Therefore, when transmission parameters (for example, a coding type in uplink control information, a quantity of resources occupied by an uplink reference signal in an uplink control channel, a status about whether the uplink control channel is sent in a frequency hopping manner, and a transmission format of the uplink control channel) other than the length of the CRC-scrambled bits are the same or similar, the power #a2, the power #b2, and the power #c2 may have the following relationship.

When same uplink control information A is sent, different coding gains may be obtained by using lengths of bits of different check codes. Therefore, in a case of a same error probability requirement, lengths of bits of different check codes correspond to different demodulation threshold requirements. Further, requirements on a transmit power are different. Without loss of generality, the power #a2, the power #b2, and the power #c2 may be in descending order. That is, power #a2>power #b2>power #c2.

Parameter 3: Information about a Quantity of Resources Occupied by an Uplink Reference Signal in the Uplink Control Channel Specifically, the resources occupied by the uplink reference signal in the uplink control channel may refer to a quantity of time domain resources (for example, symbols) occupied by the uplink reference signal in the uplink control channel.

In addition, in this embodiment of this application, when transmission parameters (for example, a coding type of the uplink control information, a length of a bit of a CRC check code, a status about whether the uplink control channel is sent in a frequency hopping manner, and a transmission format of the uplink control channel) other than the resources occupied by the uplink reference signal in the uplink control channel are the same or similar, the transmit power and the quantity of resources occupied by the uplink reference signal in the uplink control channel (for example, a quantity of symbols occupied by the uplink reference signal in the uplink control channel) may have the following relationship.

When same uplink control information A is sent, different channel estimation gains may be obtained by using resources occupied by different uplink reference signals. Therefore, in a case of a same error probability requirement, resources occupied by different uplink reference signals correspond to different demodulation threshold requirements. Further, requirements on a transmit power are different. Without loss of generality, an increase in resources occupied by an uplink reference signal on a time domain fast-varying channel may lower a requirement on a transmit power. On the contrary, a decrease in resources occupied by an uplink reference signal on a time domain slow-varying channel may lower a requirement on a transmit power.

Parameter 4: A Status about Whether the Uplink Control Channel is Sent in a Frequency Hopping Manner That a frequency hopping technology of an uplink control channel is completely different from a direct-sequence spread-spectrum technology means that a PUCCH is sent on different or discontinuous time-frequency resources, and a diversity gain is obtained by obtaining jump of channel characteristics on the different time-frequency resources, to implement robust transmission and avoid deterioration in control channel transmission performance caused by deep fading due to continuous resource allocation.

In this embodiment of this application, the uplink channel may be sent in the frequency hopping manner, or the uplink channel may not be sent in the frequency hopping manner.

As an example rather than a limitation, a transmit power when the uplink channel is sent in the frequency hopping manner is set to a power #a3, and a transmit power when the uplink channel is not sent in the frequency hopping manner is set to a power #b3. Therefore, when transmission parameters (for example, the channel coding type of the uplink control information, the quantity of resources occupied by the uplink reference signal in the uplink control channel, the bit length of the CRC check code, and the transmission format of the uplink control channel) other than the status about whether the uplink control channel is sent in the frequency hopping manner are the same or similar, the power #a3 and the power #b3 may have the following relationship.

When same uplink control information A is sent, different diversity gains may be obtained by using different frequency hopping manners. Therefore, in a case of a same error probability requirement, different frequency hopping manners correspond to different demodulation threshold requirements. Further, requirements on a transmit power are different. Without loss of generality, use of frequency hopping lowers the requirement on the transmit power, and the power #a3 and the power #b3 are in an ascending order. That is, power #a3<power #b3.

Parameter 5: A Transmission Format of the Uplink Control Channel

As an example rather than a limitation, in this embodiment of this application, the transmission format of the uplink control channel may include but is not limited to the following formats.

Different formats may correspond to different quantities of uplink control information bits, different quantities of OFDM symbols, whether there is channel coding, whether there is block spreading (block-wise spreading), and whether there is DFT precoding (pre-DFT transform precoding). In addition, as shown in the following table, a frequency domain sequence spreading manner is used for a format 0 or a format 1, and channel coding is not used for uplink control information. Channel coding is used for uplink control information corresponding to a format 2, a format 3, or a format 4. DFT precoding is not used for the format 2, and DFT precoding is used for the format 3 or the format 4. A difference lies in that block spreading is not used for the format 3 but used for the format 4.

As an example rather than a limitation, a transmit power when the format 0 is used is set to a power #a4, a transmit power when the format 1 is used is set to a power #b4, a transmit power when the format 2 is used is set to a power #c4, a transmit power when the format 3 is used is set to a power #d4, and a transmit power when the format 4 is used is set to a power #e4. Therefore, when transmission parameters (for example, a length of a check code bit in uplink control information, a quantity of resources occupied by an uplink reference signal in an uplink control channel, a status about whether the uplink control channel is sent in a frequency hopping manner, and a coding manner of the uplink control information) other than the transmission format are the same or similar, the power #a4, the power #b4, the power #c4, the power #d4, and the power #e4 may have the following relationship.

A better coding gain may be obtained by means of channel coding, and more time domain diversity gains may be obtained by using more symbols. In a same time-frequency resource, a channel coding gain is caused by a spreading gain. In addition, DFT precoding processing can reduce impact of a power amplifier on a terminal side, but may reduce a channel selection gain. Therefore, under a same error probability requirement, different formats correspond to different demodulation threshold requirements. Further, requirements on a transmit power are different. Without loss of generality, the power #a4 (or #b4), the power #e4, the power #d4, and the power #c4 may be in descending order. That is, power #a4 (or power #b4)>power #e4>power #d4>power #c4.

Optionally, in this embodiment of this application, when the transmit power #A is determined, in addition to using at least one of the foregoing parameters 1 to 5 corresponding to the uplink control information #A, a BPRE (denoted as a BPRE #A below for ease of understanding) corresponding to the uplink control information #A may be further used.

As an example rather than a limitation, in this embodiment of this application, the BPRE #A may be determined in at least one of the following manners.

Manner 1

In this embodiment of this application, a BPRE may be a ratio of a bit quantity of information bits (including CRC check bits) of uplink control information (UCI) carried on a PUCCH channel to a quantity of resource elements used by a PUCCH. That is, a total quantity of bits of the uplink control information #A is set to $O_{UCI}$, and a quantity of resource elements used by the uplink control channel on which the uplink control information #A is carried is set to $N_{RE}$, and therefore, BPRE #A=$O_{UCI}/N_{RE}$.

Manner 2

As described above, the uplink control information may include a plurality of different types of information, for example, a CSI part 1, a CSI part 2, feedback information (for example, an HARQ-ACK), and an SR.

In this case, the terminal device #A may divide the uplink control information into a plurality of parts, for example, at least two parts, based on the types of information included in the uplink control information #A.

For example, when the uplink control information includes the CSI part 1 and the CSI part 2, the terminal device #A may divide the uplink control information #A into a part #A and a part #B. The part #A includes the CSI part 1, and the part #B includes the CSI part 2.

For another example, when the uplink control information includes the feedback information (for example, an HARQ-ACK), the CSI part 1, and the CSI part 2, the part #A may include the feedback information (for example, an HARQ-ACK) and the CSI part 1, and the part #B includes the CSI part 2.

For another example, when the uplink control information includes the SR, the feedback information (for example, an HARQ-ACK), the CSI part 1, and the CSI part 2, the part #A may include the SR, the feedback information (for example, an HARQ-ACK), and the CSI part 1, and the part #B includes the CSI part 2.

In this embodiment of this application, bit rates of different parts may be different. Finally, as a result, BPREs actually corresponding to the different parts are different. For example, the uplink control information includes at least two parts, and the different parts may include a same type of information or different types of information. This is not particularly limited in this application.

For example, when the uplink control information includes two parts, different parts may correspond to different quantities of actually sent bits ($E_{UCI}=N_{RE} \cdot Q_m$, that is, a product of a quantity of resource elements used by a PUCCH and a modulation order).

The following describes a method for determining a BPRE corresponding to each part by using an example.

Assuming that $O_{UCI1}$ is a quantity of information bits corresponding to a first part, $O_{UCI2}$ is a quantity of information bits corresponding to a second part, $E_{UCI1}$ is a quantity of output bits used for actually sending the first part, and $E_{UCI2}$ is a quantity of output bits used for actually sending the second part, then a bit rate at which the first part is actually sent is $$CR_{UCI1} = \frac{O_{UCI1}}{E_{UCI1}},$$

a bit rate at which the second part is actually sent is $$CR_{UCI2} = \frac{O_{UCI2}}{E_{UCI2}},$$

a quantity of bits per resource element of the first part is $$BPRE_{UCI1} = \frac{O_{UCI1}}{E_{UCI1}/Q_m},$$

and a quantity of bits per resource element of the second part is $$BPRE_{UCI2} = \frac{O_{UCI2}}{E_{UCI2}/Q_m},$$

where $Q_m$ is a same modulation order (for example, BPSK corresponds to $Q_m=1$, and QPSK corresponds to $Q_m=2$) used for sending the first part and the second part.

In the foregoing manner, the terminal device #A may determine a BPRE (denoted as a $BPRE_1$) corresponding to the part #A included in the uplink control information #A and a BPRE (denoted as a $BPRE_2$) corresponding to the part #B included in the uplink control information #A.

Therefore, $$BPRE_1 = \frac{O_{UCI1}}{N_{RE1}}$$

or $BPRE_1 = R_{UCI}^{max} \cdot Q_m$.

$O_{UCI1}$ represents a quantity (including CRC) of information bits of the part #A, $N_{RE1}$ represents a quantity of resource elements occupied by the information bits of the part #A, and $R_{UCI}^{max}$ represents an available maximum bit rate value of a PUCCH on which the control information #A is carried. The maximum bit rate value may be predefined, or may be configured by using signaling.

Moreover, $N_{RE1}=E_{UCI1}/Q_m$.

$Q_m$ represents a modulation order used by the PUCCH, and $E_{UCI1}$ is a quantity of output bits corresponding to the information bits of the part #A.

Moreover, $$BPRE_2 = \frac{O_{UCI2}}{N_{RE2}}.$$

$O_{UCI2}$ represents a quantity (including CRC) of information bits of the part #B, and $N_{RE2}$ represents a quantity of resource elements occupied by the information bits of the part #B.

Moreover, $N_{RE2}=E_{UCI2}/Q_m$.

$Q_m$ represents a modulation order used by the PUCCH, and $E_{UCI2}$ is a quantity of output bits corresponding to the information bits of the part #B.

As an example rather than a limitation, in this embodiment of this application, the BPRE corresponding to the uplink control information may be determined based on the plurality of parts included in the uplink control information and by using the following methods.

Method a

A largest BPRE in the BPREs respectively corresponding to the plurality of parts included in the uplink control information may be used as the BPRE corresponding to the uplink control information.

For example, for the uplink control information #A, if $BPRE_1 > BPRE_2$, the terminal device #A may determine BPRE #A=$BPRE_1$.

Alternatively, if $BPRE_1 < BPRE_2$, the terminal device #A may determine BPRE #A=$BPRE_2$.

Method b

A smallest BPRE in the BPREs respectively corresponding to the plurality of parts included in the uplink control information may be used as the BPRE corresponding to the uplink control information.

For example, for the uplink control information #A, if $BPRE_1 > BPRE_2$, the terminal device #A may determine BPRE #A=$BPRE_2$.

Alternatively, if $BPRE_1 < BPRE_2$, the terminal device #A may determine BPRE #A=$BPRE_1$.

Method c

In the plurality of parts included in the uplink control information, a BPRE corresponding to a number value located at a stipulated part may be used as the BPRE corresponding to the uplink control information. The stipulation may be predefined.

For example, if the number value at the stipulated part is a corresponding smallest number value in all parts of the uplink control information, for the uplink control information #A, if a smallest number value part is the first part #A, the terminal device #A may determine BPRE #A=$BPRE_1$.

For another example, if the number value at the stipulated part is a corresponding largest number value in all parts of the uplink control information, for the uplink control information #A, if a largest number value part is the part #B, the terminal device #A may determine BPRE #A=$BPRE_2$.

Method d

An average value (for example, an arithmetic average value or a weighted average value) of BPREs respectively corresponding to the plurality of parts included in the uplink control information may be used as the BPRE corresponding to the uplink control information.

For example, for the uplink control information #A, the terminal device #A may determine BPRE #A=(a·$BPRE_1$+b·$BPRE_2$)/2, where a is a weight of the part #A, b is a weight of the part #B, and specific values of a and b may be indicated by the network device, or specific values of a and b may be stipulated in a communication protocol.

After determining the BPRE #A in either the manner 1 or the manner 2, the terminal device #A may determine a compensation power (denoted as $\Delta_{TF}$) based on at least one of the parameters 1 to 4 and the BPRE #A.

Specifically, a transmit power of the PUCCH is mainly determined by an open-loop power value P0, a path loss value PL, and a closed-loop power control value g. In addition, to better compensate for different demodulation signal-to-noise ratios required for different PUCCH format transmission formats, a corresponding transmit power $\Delta_{F-PUCCH}$ needs to be compensated for by means of power control. Further, to compensate for a difference between demodulation signal-to-noise ratios (SNRs) when the PUCCH uses different transmission parameters, the transmit power needs to be further adjusted based on the transmission parameters to meet requirements of different SNRs, that is, $\Delta_{TF}$. For example, a signal-to-noise ratio required for sending a PUCCH corresponding to a first transmission parameter is an SNR 1, and a signal-to-noise ratio required for sending a PUCCH corresponding to a second transmission parameter is an SNR 2. On the premise that a noise power does not change, a difference between a transmit power of the PUCCH corresponding to the second transmission parameter and a transmit power of the PUCCH corresponding to the first transmission parameter needs to exist, and may be defined as $\Delta_{TF}$. In this way, on the premise that other PUCCH transmit power parameters (such as an open-loop power parameter, a path loss parameter, and a closed-loop power parameter) do not change, for powers required for different PUCCHs sent by using different transmission parameters, different SNRs on a receive side can be implemented provided that $\Delta_{TF}$ is adjusted. A power required for sending a PUCCH channel is determined by P0, PL, $\Delta_{F-PUCCH}$, $\Delta_{TF}$ and g, and $\Delta_{TF}$ is mainly discussed in this application. Therefore, the power determined by P0, PL, $\Delta_{F-PUCCH}$, and g is defined as a reference power.

As an example rather than a limitation, in this embodiment of this application, the terminal device #A may determine $\Delta_{TF}$ based on the following Formula 2.

$$\Delta_{TF}=10 \log_{10}[f(k_1 \cdot T, k_2)] \quad \text{Formula 2}$$

T represents the BPRE #A, $k_1$ represents a BPRE compensation coefficient, $k_2$ represents a signal-to-noise ratio compensation coefficient, and $f(k_1 \cdot T, k_2)$ is a preset function that uses T, $k_2$, and $k_1$ as variables.

As an example rather than a limitation, in this embodiment of this application, $f(k_1 \cdot T, k_2) = k_2 \cdot (2^{k_1 \cdot T} - 1)$.

Alternatively, $f(k_1 \cdot T, k_2) = (2^{k_1 \cdot T} - 1)^{k_2}$.

$k_1$ and $k_2$ are values not less than 0.

Optionally, $k_2$ may be fixed to 1.

Optionally, a value of $k_1$ may be determined based on at least one of the parameters 1 to 5.

For example, for the parameter 1, $k_1$ when an RM code is used is set to $k_1$ #a1, $k_1$ when a convolutional code is used is set to $k_1$ #b1, $k_1$ when a turbo code is used is set to $k_1$ #c1, and $k_1$ when a polar code is used is set to $k_1$ #d1. Therefore, when transmission parameters (for example, a length of a check code bit in uplink control information, a quantity of resources occupied by an uplink reference signal in an uplink control channel, a status about whether the uplink control channel is sent in a frequency hopping manner, and a transmission format of the uplink control channel) other than the coding type are the same or similar, $k_1$ #a1, $k_1$ #b1, $k_1$ #c1, and $k_1$ #d1 may have the following relationship.

Without loss of generality, $k_1$ #a1, $k_1$ #b1, $k_1$ #c1, and $k_1$ #d1 may be in descending order. That is, $k_1$ #a1>$k_1$ #b1>$k_1$ #c1>$k_1$ #d1.

For another example, for the parameter 2, $k_1$ when the length of the CRC check bit is 0 is set to $k_1$ #a2, and $k_1$ when the length of the CRC check bit is 6 is set to $k_1$ #b2, and $k_1$ when the length of the CRC check bit is 11 is set to $k_1$ #c2, Therefore, when transmission parameters (for example, the coding type of the uplink control information, the quantity of resources occupied by the uplink reference signal in the uplink control channel, the status about whether the uplink control channel is sent in the frequency hopping manner, and the transmission format of the uplink control channel) other than the length of the CRC check bit are the same or similar, $k_1$ #a2, $k_1$ #b2, and $k_1$ #c2 may have the following relationship.

Without loss of generality, $k_1$ #a2, k #b2, and $k_1$ #c2 may be in descending order. That is, $k_1$ #a2>k #b2>$k_1$ #c2.

For another example, for the parameter 3, $k_1$ and the quantity of resources occupied by the uplink reference signal in the uplink control channel (for example, a quantity of symbols occupied by the uplink reference signal in the uplink control channel) may have the following relationship.

Without loss of generality, an increase in resources occupied by an uplink reference signal on a time domain fast-varying channel may progressively decrease $k_1$, and an increase in resources occupied by an uplink reference signal on a time domain slow-varying channel may progressively increase $k_1$.

For another example, for the parameter 4, $k_1$ when the uplink channel is sent in the frequency hopping manner is set to $k_1$ #a3, and $k_1$ when the uplink channel is not sent in the frequency hopping manner is set to $k_1$ #b3. Therefore, when transmission parameters (for example, the coding type of the uplink control information, the quantity of resources occupied by the uplink reference signal in the uplink control channel, a length of a CRC-scrambled bit, and the transmission format of the uplink control channel) other than the status about whether the uplink control channel is sent in the frequency hopping manner are the same or similar, $k_1$ #a3 and $k_1$ #b3 may have the following relationship.

Without loss of generality, $k_1$ #a3 and $k_1$ #b3 are in ascending order. That is, $k_1$ #a3<$k_1$ #b3. For another example, for the parameter 5, $k_1$ when the format 0 is used is set to $k_1$ #a4, $k_1$ when the format 1 is used is set to $k_1$ #b4, $k_1$ when the format 2 is used is set to $k_1$ #c4, $k_1$ when the format 3 is used is set to $k_1$ #d4, and $k_1$ when the format 4 is used is set to $k_1$ #e4. Therefore, when transmission parameters (for example, the length of the check bit in the uplink control information, the quantity of resources occupied by the uplink reference signal in the uplink control channel, the status about whether the uplink control channel is sent in the frequency hopping manner, and the coding manner of the uplink control information) other than the transmission format are the same or similar, $k_1$ #a4 (or $k_1$ #b4), $k_1$ #c4, $k_1$ #d4, and $k_1$ #e4 may have the following relationship.

Without loss of generality, $k_1$ #a4 (or $k_1$ #b4), $k_1$ #e4, $k_1$ #d4, and $k_1$ #c4 may be in descending order. That is, $k_1$ #a4 (or $k_1$ #b4)>$k_1$ #e4>k #d4>$k_1$ #c4.

Optionally, a value of $k_2$ may be determined based on at least one of the parameters 1 to 5.

For example, for the parameter 1, $k_2$ when an RM code is used is set to $k_2$ #a1, $k_2$ when a convolutional code is used is set to $k_2$ #b1, $k_2$ when a turbo code is used is set to $k_2$ #c1, and $k_2$ when a polar code is used is set to $k_2$ #d1. Therefore, when transmission parameters (for example, a length of a check code bit in uplink control information, a quantity of resources occupied by an uplink reference signal in an uplink control channel, a status about whether the uplink control channel is sent in a frequency hopping manner, and a transmission format of the uplink control channel) other than the coding type are the same or similar, $k_2$ #a1, $k_2$ #b1, $k_2$ #c1, and $k_2$ #d1 may have the following relationship.

Without loss of generality, $k_2$ #a1, $k_2$ #b1, $k_2$ #c1, and $k_2$ #d1 may be in descending order. That is, $k_2$ #a1>$k_2$ #b1>$k_2$ #c1>$k_2$ #d1.

For another example, for the parameter 2, $k_2$ when the length of the CRC check bit is 0 is set to $k_2$ #a2, and $k_2$ when the length of the CRC check bit is 6 is set to $k_2$ #b2, and $k_2$ when the length of the CRC check bit is 11 is set to $k_2$ #c2, Therefore, when transmission parameters (for example, the coding type of the uplink control information, the quantity of resources occupied by the uplink reference signal in the uplink control channel, the status about whether the uplink control channel is sent in the frequency hopping manner, and the transmission format of the uplink control channel) other than the length of the CRC check bit are the same or similar, $k_2$ #a2, $k_2$ #b2, and $k_2$ #c2 may have the following relationship.

Without loss of generality, $k_2$ #a2, $k_2$ #b2, and $k_2$ #c2 may be in descending order. That is, $k_2$ #a2>$k_2$ #b2>$k_2$ #c2.

For another example, for the parameter 3, $k_2$ and the quantity of resources occupied by the uplink reference signal in the uplink control channel (for example, a quantity of symbols occupied by the uplink reference signal in the uplink control channel) may have the following relationship.

Without loss of generality, an increase in resources occupied by an uplink reference signal on a time domain fast-varying channel may progressively decrease $k_2$, and an increase in resources occupied by an uplink reference signal on a time domain slow-varying channel may progressively increase $k_2$.

For another example, for the parameter 4, $k_2$ when the uplink channel is sent in the frequency hopping manner is set to $k_2$ #a3, and $k_2$ when the uplink channel is not sent in the frequency hopping manner is set to $k_2$ #b3. Therefore, when transmission parameters (for example, the channel coding type of the uplink control information, the quantity of resources occupied by the uplink reference signal in the uplink control channel, the length of the CRC check bit, and the transmission format of the uplink control channel) other than the status about whether the uplink control channel is sent in the frequency hopping manner are the same or similar, $k_2$ #a3 and $k_2$ #b3 may have the following relationship.

Without loss of generality, $k_2$ #a3 and $k_2$ #b3 are in ascending order. That is, $k_2$ #a3<$k_2$ #b3.

For another example, for the parameter 5, $k_2$ when the format 0 is used is set to $k_2$ #a4, $k_2$ when the format 1 is used is set to $k_2$ #b4, $k_2$ when the format 2 is used is set to $k_2$ #c4, $k_2$ when the format 3 is used is set to $k_2$ #d4, and $k_2$ when the format 4 is used is set to $k_2$ #e4. Therefore, when transmission parameters (for example, the length of the check bit in the uplink control information, the quantity of resources occupied by the uplink reference signal in the uplink control channel, the status about whether the uplink control channel is sent in the frequency hopping manner, and the channel coding type of the uplink control information) other than the transmission format are the same or similar, $k_2$ #a4 (or $k_2$ #b4), $k_2$ #c4, $k_2$ #d4, and $k_2$ #e4 may have the following relationship.

$k_2$ #a4 (or $k_2$ #b4), $k_2$ #e4, $k_2$ #d4, and $k_2$ #c4 are in descending order. That is, $k_2$ #a4 (or $k_2$ #b4)>$k_2$ #e4>$k_2$ #d4>$k_2$ #c4.

Optionally, in this embodiment of this application, the terminal device #A may maintain a mapping relationship entry, and the mapping relationship entry may be used to indicate mapping relationships between a plurality of parameter groups and a plurality of compensation coefficient groups.

Each parameter group includes at least one of the parameters 1 to 5, and there is at least one parameter that is different from each other between any two parameter groups.

In addition, each compensation coefficient group includes at least one coefficient of $k_1$ and $k_2$, and there is at least one coefficient that is different from each other between any two coefficient groups.

An example of the mapping relationship entry is shown in the following Table 2.

TABLE 2

| Channel coding type | Length of a check bit | Quantity of symbols occupied by an uplink reference signal | Whether to send in a frequency hopping manner | Transmission format | $k_1$ | $k_2$ |
|---|---|---|---|---|---|---|
| RM code | No check bit | 1 | No | Format 2 | 2.5 | 2 |
| Polar code | CRC = 6 | 1 | No | Format 2 | 2 | 0.6 |
| Polar code | CRC = 11 | 1 | No | Format 2 | 1.5 | 0.6 |
| Polar code | CRC = 11 | 1 | Yes | Format 2 | 1.5 | 0.2 |

Another example of the mapping relationship entry is shown in the following Table 3. The example indicates that $(k_1, k_2)$ in compensation coefficient sets corresponding to different channel coding types is different.

TABLE 3

| Channel coding type | $k_1$ | $k_2$ |
|---|---|---|
| RM code | 2.5 | 2 |
| Polar code | 2 | 0.6 |

Another example of the mapping relationship entry is shown in the following Table 4. The example indicates that in compensation coefficient sets corresponding to different channel coding types, $k_1$ is different, and $k_2$ is the same.

TABLE 4

| Channel coding type | $k_1$ | $k_2$ |
|---|---|---|
| RM code | 2.5 | 1 |
| Polar code | 2 | 1 |

Still another example of the mapping relationship entry is shown in the following Table 5. The example indicates that $(k_1, k_2)$ in compensation coefficient sets corresponding to different check bit lengths is different.

TABLE 5

| Length of a check bit | $k_1$ | $k_2$ |
|---|---|---|
| CRC = 6 | 2 | 0.8 |
| CRC = 11 | 1.5 | 0.6 |

Still another example of the mapping relationship entry is shown in the following Table 6. The example indicates that in compensation coefficient sets corresponding to different check bit lengths, $k_1$ is different, and $k_2$ is the same.

TABLE 6

| Length of a check bit | $k_1$ | $k_2$ |
|---|---|---|
| CRC = 6 | 2 | 1 |
| CRC = 11 | 1.5 | 1 |

Still another example of the mapping relationship entry is shown in the following Table 7. The example indicates that in compensation coefficient sets corresponding to different quantities of symbols occupied by an uplink reference signal, $k_1$ is the same, and $k_2$ is different.

TABLE 7

| Quantity of symbols occupied by an uplink reference signal | $k_1$ | $k_2$ |
|---|---|---|
| 1 | 1.5 | 0.6 |
| 2 | 1.5 | 0.2 |

Still another example of the mapping relationship entry is shown in the following Table 8. The example indicates that in compensation coefficient sets corresponding to different frequency hopping manners, $k_1$ is the same, and $k_2$ is different.

TABLE 8

| Whether to send in a frequency hopping manner | $k_1$ | $k_2$ |
|---|---|---|
| Yes | 1.5 | 0.2 |
| No | 1.5 | 0.6 |

Another example of the mapping relationship entry is shown in the following Table 9. The example indicates that in compensation coefficient sets corresponding to different transmission formats, $(k_1, k_2)$ is different.

TABLE 9

| Transmission format | $k_1$ | $k_2$ |
|---|---|---|
| Format 2 | 1.5 | 0.2 |
| Format 3 | 2 | 0.4 |
| Format 4 | 2.5 | 0.6 |

It should be understood that the entries listed above are merely examples for description, and this application is not limited thereto. A value of $k_1$ or $k_2$ may be appropriately changed based on an actual use status and based on one or more of the foregoing parameters 1 to 5.

In addition, the entries listed above are only a feasible manner of manners for determining $k_1$ or $k_2$. This application is not limited thereto. For example, the value of $k_1$ or $k_2$ may be alternatively determined based on some parameters or parameter values in any one of the entries above, for example, based on values in some rows or columns in Table 2.

For another example, alternatively, only the value of $k_1$ may be determined based on one or more of the parameters 1 to 5. In other words, a column corresponding to $k_2$ may not exist in Table 2 to Table 9. In this case, as an example rather than a limitation, a value of $k_2$ may be a fixed constant, for example, $k_{2=1}$. The value of $k_2$ may be stipulated in a communications system or a communication protocol, or may be configured by the network device. This is not particularly limited in this application.

Therefore, the terminal device #A may determine, based on a parameter (for example, at least one parameter of a channel coding type of the uplink control information #A, a length of a check code bit in the uplink control information #A, a quantity of resources occupied by an uplink reference signal in a PUCCH on which the uplink control information #A is carried, a status about whether the PUCCH on which the uplink control information #A is carried is sent in a frequency hopping manner, and a transmission format of the uplink control information #A) of the uplink control information A and from the mapping relationship entry, a coefficient group corresponding to the parameter of the uplink control information #A, and use coefficients in the coefficient group as $k_1$ and $k_2$ used when $\Delta_{TF}$ is determined based on the foregoing Formula 1.

It should be noted that, in this embodiment of this application, the mapping relationship entry may be sent by the network device to the terminal device #A in advance (for example, by using higher layer signaling). That is, optionally, the network device may further send information about the mapping relationship entry to the terminal device #A by using, for example, radio resource control (RRC) layer signaling.

Alternatively, the mapping relationship entry may be stipulated in a communications system or a communication protocol, or the mapping relationship entry may be configured by an operator or a manufacturer in the terminal device. This is not particularly limited in this application.

In S220, the terminal device #A may send, to the network device by using the determined transmit power as stated above, the PUCCH on which the uplink control information #A is carried.

According to the uplink control channel sending method in this application, the transmit power is determined based on at least one of the information about the channel coding type of the uplink control information in the uplink control channel, the information about the length of the check code bit in the uplink control information, the information about the quantity of resources occupied by the uplink reference signal in the uplink control channel, the information about whether the uplink control channel is sent in the frequency hopping manner, or the transmission format of the uplink control channel, so that the determined transmit power meets different requirements on a demodulation signal-to-noise ratio, thereby improving communication reliability and accuracy.

Figure 3:
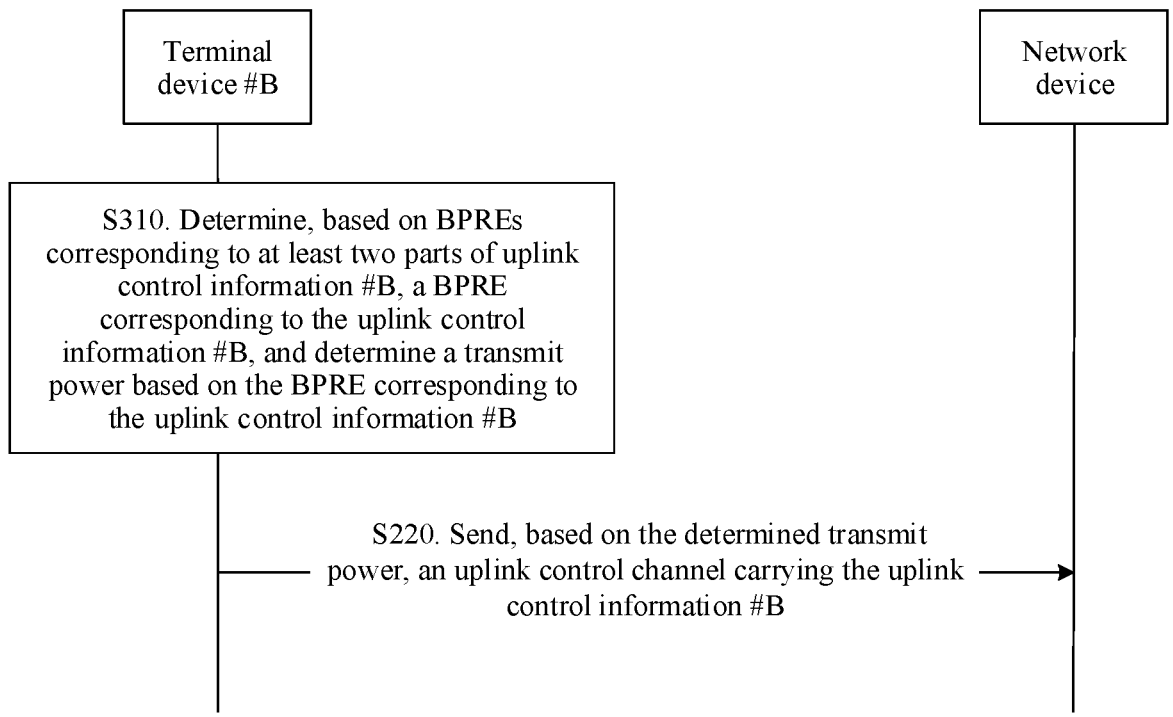
FIG. 3 is a schematic interaction diagram of an example of an uplink control channel sending method according to this application.

The following describes in detail a specific procedure of a data sending method 300 according to an embodiment of this application with reference to FIG. 3.

As shown in FIG. 3, in S310, a terminal device #B (namely, an example of the terminal device) may determine a transmit power #B (namely, an example of the transmit power) for sending uplink control information #B (namely, an example of the uplink control information).

In this embodiment of this application, when the transmit power #B is determined, a BPRE (denoted as a BPRE #B below for ease of understanding) corresponding to the uplink control information #B may be used.

In this embodiment of this application, the uplink control information may include a plurality of different information types, for example, a CSI part 1, a CSI part 2, feedback information (for example, an HARQ-ACK), and an SR.

In this case, the terminal device #B may divide the uplink control information into a plurality of parts, for example, at least two parts, based on types of the information included in the uplink control information #B.

For example, when the uplink control information includes the CSI part 1 and the CSI part 2, the terminal device #B may divide the uplink control information #B into a part #1 and a part #2. The part #1 includes the CSI part 1, and the part #2 includes the CSI part 2.

For another example, when the uplink control information includes the feedback information (for example, an HARQ-ACK), the CSI part 1, and the CSI part 2, the part #1 may include the feedback information (for example, an HARQ-ACK) and the CSI part 1, and the part #2 includes the CSI part 2.

For another example, when the uplink control information includes the SR, the feedback information (for example, an HARQ-ACK), the CSI part 1, and the CSI part 2, the part #1 may include the SR, the feedback information (for example, an HARQ-ACK) and the CSI part 1, and the part #2 includes the CSI part 2.

In this embodiment of this application, bit rates of different parts may be different. Finally, as a result, BPREs actually corresponding to the different parts are different. For example, the uplink control information includes at least two parts, and the different parts may include a same type of information or different types of information. This is not particularly limited in this application.

For example, when the uplink control information includes two parts, different parts may correspond to different quantities of actually sent bits ($E_{UCI} = N_{RE} \cdot Q_m$, that is, a product of a quantity of resource elements used by a PUCCH and a modulation order).

The following describes a method for determining a BPRE corresponding to each part by using an example.

Assuming that $O_{UCI1}$ is a quantity of information bits corresponding to a first part, $O_{UCI2}$ is a quantity of information bits corresponding to a second part, $E_{UCI1}$ is a quantity of output bits used for actually sending the first part is, and $E_{UCI2}$ is a quantity of output bits used for actually sending the second part, then, a bit rate at which the first part is actually sent is $$CR_{UCI1} = \frac{O_{UCI1}}{E_{UCI1}},$$

a bit rate at which the second part is actually sent is $$CR_{UCI2} = \frac{O_{UCI2}}{E_{UCI2}},$$

a quantity of bits per resource element of the first part is $$BPRE_{UCI1} = \frac{O_{UCI1}}{E_{UCI1}/Q_m},$$

and a quantity of bits per resource element of the second part is $$BPRE_{UCI2} = \frac{O_{UCI2}}{E_{UCI2}/Q_m},$$

where $Q_m$ is a same modulation order (for example, BPSK corresponds to $Q_m=1$, and QPSK corresponds to $Q_m=2$) used for sending the first part and the second part.

In the foregoing manner, the terminal device #B may determine a BPRE (denoted as a $BPRE_A$) corresponding to the part #1 included in the uplink control information #B and a BPRE (denoted as a $BPRE_B$) corresponding to the part #2 included in the uplink control information #B.

Therefore, $$BPRE_A = \frac{O_{UCIA}}{N_{REA}}$$

or $BPRE_B = R_{UCI}^{max} \cdot Q_m$.

$O_{UCIA}$ represents a quantity (including CRC) of information bits of the part #1, $N_{REA}$ represents a quantity of resource elements occupied by the information bits of the part #1, and $R_{UCI}^{max}$ represents an available maximum bit rate value of a PUCCH on which the uplink control information #B is carried. The maximum bit rate value may be predefined, or may be configured by using signaling.

Moreover, $N_{REA}=E_{UCIA}/Q_m$ $Q_m$ represents a modulation order used by the PUCCH, and $E_{UCIA}$ is a quantity of output bits corresponding to the information bits of the part #1.

Moreover, $$BPRE_B = \frac{O_{UCIB}}{N_{REB}}.$$

$O_{UCIB}$ represents a quantity (including CRC) of information bits of the part #2, and $N_{RB}$ represents a quantity of resource elements occupied by the information bits of the part #2.

Moreover, $N_{REB}=E_{UCIB}/Q_m$.

$Q_m$ represents a modulation order used by the PUCCH, and $E_{UCIB}$ is a quantity of output bits corresponding to the information bits of the part #B.

As an example rather than a limitation, in this embodiment of this application, the BPRE corresponding to the uplink control information may be determined based on the plurality of parts included in the uplink control information and by using the following methods.

Method a

A largest BPRE in the BPREs respectively corresponding to the plurality of parts included in the uplink control information may be used as the BPRE corresponding to the uplink control information.

For example, for the uplink control information #A, if $BPRE_A > BPRE_B$, the terminal device #A may determine BPRE #B=$BPRE_A$.

Alternatively, if $BPRE_A < BPRE_B$, the terminal device #A may determine BPRE #B=$BPRE_B$.

Method b

A smallest BPRE in the BPREs respectively corresponding to the plurality of parts included in the uplink control information may be used as the BPRE corresponding to the uplink control information.

For example, for the uplink control information #B, if $BPRE_A > BPRE_B$, the terminal device #B may determine BPRE #B=$BPRE_B$.

Alternatively, if $BPRE_A < BPRE_B$, the terminal device #A may determine BPRE #B=$BPRE_A$.

Method c

In the plurality of parts included in the uplink control information, a BPRE corresponding to a number value located at a stipulated part may be used as the BPRE corresponding to the uplink control information. The stipulation may be predefined.

For example, if the number value at the stipulated part is a corresponding smallest number value in all parts of the uplink control information, for the uplink control information #B, if a smallest number value part is the part #1, the terminal device #B may determine BPRE #B=$BPRE_A$. For another example, if the number value at the stipulated part is a corresponding largest number value in all parts of the uplink control information, for the uplink control information #B, if a largest number value part is the part #2, the terminal device #B may determine BPRE #B=$BPRE_B$.

Method d

An average value (for example, an arithmetic average value or a weighted average value) of BPREs respectively corresponding to the plurality of parts included in the uplink control information may be used as the BPRE corresponding to the uplink control information.

For example, for the uplink control information #B, the terminal device #B may determine BPRE #B=$(x \cdot BPRE_A + y \cdot BPRE_B)/2$, where x is a weight of the part #1, y is a weight of the part #2, and specific values of x and y may be indicated by a network device, or specific values of x and y may be stipulated in a communication protocol.

Then, the terminal device #B may determine a compensation power (denoted as $\Delta_{TF}$) based on the BPRE #B.

Specifically, a transmit power of the PUCCH is mainly determined by an open-loop power value P0, a path loss value PL, and a closed-loop power control value g. In addition, to better compensate for different demodulation signal-to-noise ratios required for different PUCCH format transmission formats, a corresponding transmit power needs to be compensated for by means of power control. Further, to compensate for a difference between demodulation signal-to-noise ratios (SNRs) when the PUCCH uses different transmission parameters, the transmit power needs to be further adjusted based on the transmission parameters to meet requirements of different SNRs, that is, $\Delta_{TF}$. For example, a signal-to-noise ratio required for sending a PUCCH corresponding to a first transmission parameter is an SNR 1, and a signal-to-noise ratio required for sending a PUCCH corresponding to a second transmission parameter is an SNR 2. On the premise that a noise power does not change, a difference between a transmit power of the PUCCH corresponding to the second transmission parameter and a transmit power of the PUCCH corresponding to the first transmission parameter needs to exist, and may be defined as $\Delta_{TF}$. In this way, on the premise that other PUCCH transmit power parameters (such as an open-loop power parameter, a path loss parameter, and a closed-loop power parameter) do not change, for powers required for different PUCCHs sent by using different transmission parameters, different SNRs on a receive side can be implemented provided that $\Delta_{TF}$ is adjusted.

As an example rather than a limitation, in this embodiment of this application, the terminal device #A may determine $\Delta_{TF}$ based on the foregoing Formula 1 or Formula 2. In addition, a specific process may be similar to a related process in the prior art or the foregoing method 200. Herein, to avoid repetition, detailed descriptions thereof are omitted.

In S320, the terminal device #B may send, to the network device by using the determined transmit power as stated above, the PUCCH on which the uplink control information #B is carried.

According to the uplink control channel sending method in this application, the terminal device determines the BPRE corresponding to each of the at least two parts included in the uplink control information, determines the BPRE of the uplink control information based on the BPRE corresponding to each part, and determines the transmit power of the uplink control information based on the determined BPRE. In this way, the used BPRE can accurately reflect a requirement of a part that is in the uplink control information and that has a relatively high requirement on a transmit power, so that communication reliability and accuracy can be improved.

Figure 4:
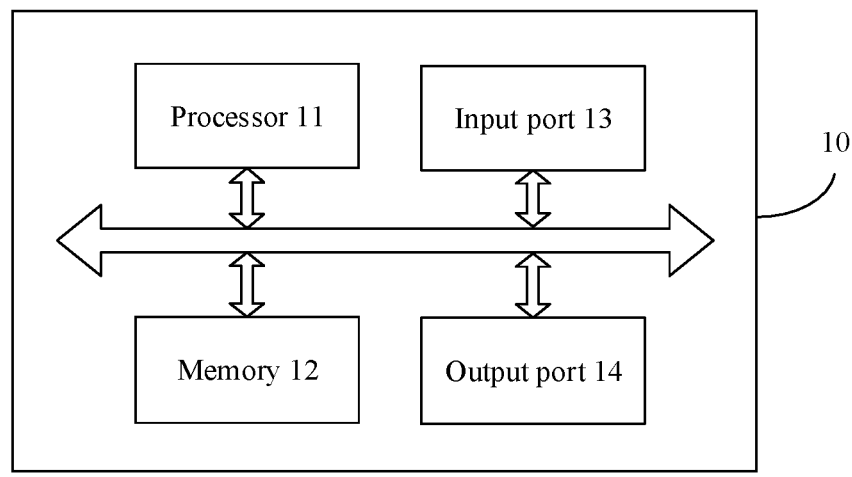
FIG. 4 is a schematic block diagram of an example of an uplink control channel sending apparatus according to this application.

According to the foregoing method, FIG. 4 is a schematic diagram of an uplink control channel sending apparatus 10 according to an embodiment of this application. As shown in FIG. 4, the apparatus 10 may be a terminal device (for example, the terminal device #A or the terminal device #B), or may be a chip or a circuit, for example, may be a chip or a circuit disposed in a sending device.

The apparatus 10 may include a processor 11 (namely, an example of a processing unit) and a memory 12. The memory 12 is configured to store an instruction. The processor 11 is configured to execute the instruction stored in the memory 12, so that the apparatus 20 implements the steps performed by the terminal device (for example, the terminal device #A or the terminal device #B) in the corresponding method shown in FIG. 3 or FIG. 4.

Further, the apparatus 10 may further include an input port 13 (namely, an example of a communications unit) and an output port 14 (namely, another example of the communications unit). Further, the processor 11, the memory 12, the input port 13, and the output port 14 may communicate with each other by using an internal connection path, to transfer a control and/or data signal. The memory 12 is configured to store a computer program. The processor 11 may be configured to invoke the computer program from the memory 12 and run the computer program to control the input port 13 to receive a signal, and control the output port 14 to send a signal, to complete the steps of the terminal device in the foregoing method. The memory 12 may be integrated into the processor 11, or may be separated from the processor 11.

Optionally, if the communications apparatus 10 is a sending device, the input port 13 is a receiver, and the output port 14 is a transmitter. The receiver and the transmitter may be a same physical entity or different physical entities. When the receiver and the transmitter are the same physical entity, the receiver and the transmitter may be collectively referred to as a transceiver.

Optionally, if the communications apparatus 10 is a chip or a circuit, the input port 13 is an input interface, and the output port 14 is an output interface.

In an implementation, it may be considered that functions of the input port 13 and the output port 14 are implemented by using a transceiver circuit or a dedicated transceiver chip. It may be considered that the processor 11 is implemented by using a dedicated processing chip, processing circuit, or processor, or a universal chip.

In another implementation, it may be considered that the terminal device provided in this embodiment of this application is implemented in a form of a general-purpose computer. In other words, program code for implementing the functions of the processor 11, the input port 13, and the output port 14 is stored in the memory 12, and a general-purpose processor executes the code in the memory 12 to implement the functions of the processor 11, the input port 13, and the output port 14.

The modules or units in the communications apparatus 10 may be configured to perform actions or processing processes performed by the device #A in the foregoing method. To avoid repetition, detailed descriptions are omitted herein.

For concepts, explanations, and detailed descriptions related to the apparatus 10 and the technical solutions provided in this embodiment of this application and other steps, refer to the descriptions of the content in the foregoing method or other embodiments. Details are not described herein again.

Figure 5:
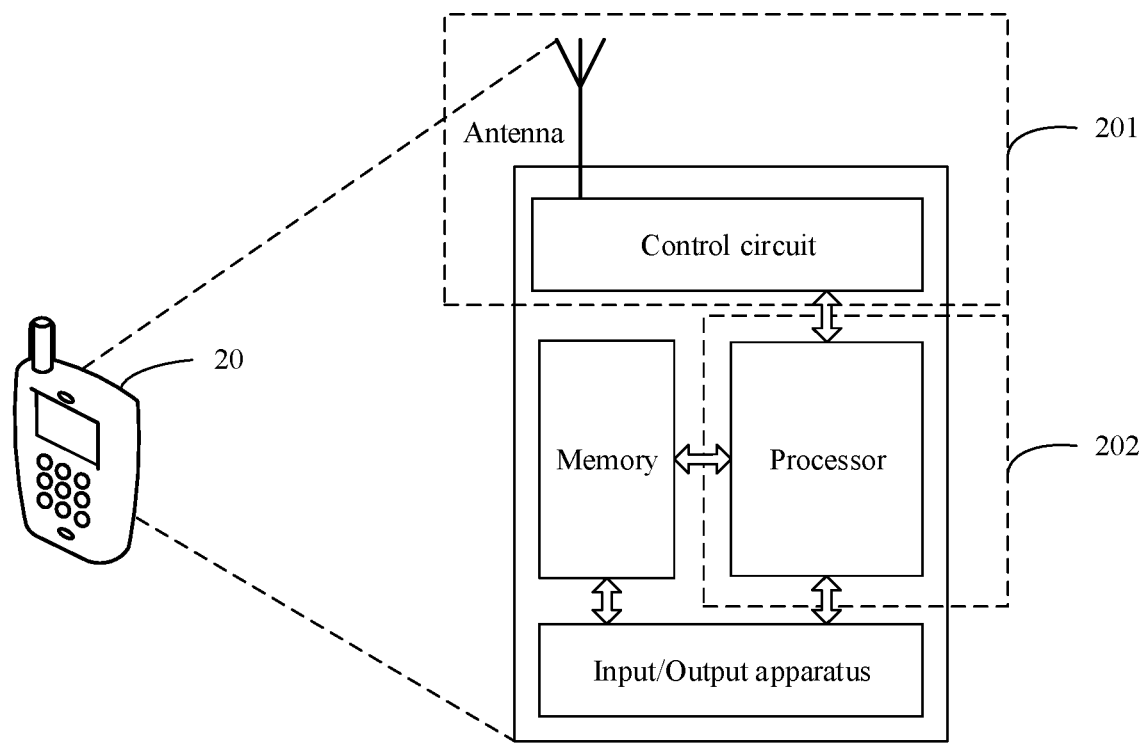
FIG. 5 is a schematic block diagram of an example of a terminal device according to an embodiment of this application.

FIG. 5 is a schematic structural diagram of a terminal device 20 according to this application. For ease of description, FIG. 5 shows only main components of the terminal device. As shown in FIG. 5, the terminal device 20 includes a processor, a memory, a control circuit, an antenna, and an input/output apparatus.

The processor is mainly configured to: process a communication protocol and communication data, control the entire terminal device, execute a software program, and process data of the software program, for example, is configured to support the terminal device in performing the action described in the embodiment of the foregoing indication method for transmitting a precoding matrix. The memory is mainly configured to store a software program and data, for example, store a codebook described in the foregoing embodiment. The control circuit is mainly configured to perform conversion between a baseband signal and a radio frequency signal, and process the radio frequency signal. A combination of the control circuit and the antenna may also be referred to as a transceiver that is mainly configured to receive and transmit a radio frequency signal in an electromagnetic wave form. The input/output apparatus, such as a touchscreen, a display, or a keyboard, is mainly configured to: receive data entered by a user, and output data to the user.

After the terminal device is powered on, the processor may read a software program in a storage unit, interpret and execute an instruction of the software program, and process data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends a radio frequency signal outward in the electromagnetic wave form by using the antenna. When data is sent to the terminal device, the radio frequency circuit receives the radio frequency signal by using the antenna, converts the radio frequency signal into a baseband signal, and outputs the baseband signal to the processor, and the processor converts the baseband signal into data and processes the data.

A person skilled in the art may understand that, for ease of description, FIG. 5 shows only one memory and one processor. In an actual terminal device, there may be a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data, and the central processing unit is mainly configured to: control the entire terminal device, execute the software program, and process the data of the software program. The processor in FIG. 5 integrates functions of the baseband processor and the central processing unit. A person skilled in the art may understand that the baseband processor and the central processing unit may be individually independent processors, and are interconnected by using a technology such as a bus. A person skilled in the art may understand that, the terminal device may include a plurality of baseband processors to adapt to different network standards, the terminal device may include a plurality of central processing units to enhance a processing capability of the terminal device, and the components of the terminal device may be connected by using various buses. The baseband processor may also be expressed as a baseband processing circuit or a baseband processing chip. The central processing unit may alternatively be expressed as a central processing circuit or a central processing chip. A function of processing the communication protocol and the communication data may be built in the processor, or may be stored in the storage unit in a form of a software program. The processor executes the software program to implement a baseband processing function.

For example, in this embodiment of this application, an antenna having receiving and transmitting functions and a control circuit may be considered as a transceiver unit 201 of the terminal device 20, and a processor having a processing function may be considered as a processing unit 202 of the terminal device 20. As shown in FIG. 5, the terminal device 20 includes the transceiver unit 201 and the processing unit 202. The transceiver unit may also be referred to as a transceiver, a transceiver apparatus, or the like. Optionally, a component configured to implement a receiving function in the transceiver unit 201 may be considered as a receiving unit, and a component configured to implement a transmitting function in the transceiver unit 201 may be considered as a transmitting unit. In other words, the transceiver unit 201 includes the receiving unit and the transmitting unit. For example, the receiving unit may also be referred to as a receiver, a receiver circuit, or the like, and the transmitting unit may be referred to as a transmitter, a transmitter, a transmitter circuit, or the like.

The terminal device shown in FIG. 5 may perform actions performed by the sending device or the receiving device in the method 200. Herein, to avoid repetition, detailed descriptions thereof are omitted.

It should be understood that in this embodiment of this application, the processor may be a central processing unit (CPU), or the processor may be another general-purpose processor, a digital signal processor (DSP), an application specific integrated circuit (ASIC), a field programmable gate array (FPGA), or another programmable logical device, discrete gate or transistor logical device, discrete hardware component, or the like. The general-purpose processor may be a microprocessor, or the processor may be any conventional processor or the like.

It should be further understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) used as an external cache. Through example but not limitative description, many forms of random access memories (RAMs) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus random access memory (direct rambus RAM, DR RAM).

All or some of the foregoing embodiments may be implemented by software, hardware, firmware, or any combination thereof. When software is used to implement the embodiments, the foregoing embodiments may be implemented completely or partially in a form of a computer program product. The computer program product includes one or more computer instructions or computer programs. When the computer instructions or computer programs are loaded and executed on the computer, all or some of the procedures or functions according to the embodiments of this application are generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, including one or more usable medium sets. The usable medium may be a magnetic medium (for example, a floppy disk, a hard disk, or a magnetic tape), an optical medium (for example, a DVD), a semiconductor medium, or the like. The semiconductor medium may be a solid-state drive.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of this application, sequence numbers of the foregoing processes do not mean execution sequences. The execution sequences of the processes should be determined based on functions and internal logic of the processes, and should not constitute any limitation to implementation processes of the embodiments of this application.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraint conditions of the technical solutions. A person skilled in the art may use a different method for each particular application to implement the described functions, but it should not be considered that the implementation goes beyond the scope of this application. It may be clearly understood by a person skilled in the art that for the purpose of convenient and brief description, for a specific working process of the described system, apparatus, and unit, refer to a corresponding process in the foregoing method embodiments. Details are not described herein again. In the several embodiments provided in this application, it should be understood that the disclosed system, apparatus, and method may be implemented in another manner. For example, the apparatus embodiments described above are only examples. For example, the unit division is merely logical function division and may be other division in actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments. In addition, functional units in the embodiments of this application may be integrated into one processing unit, or each of the units may exist alone physically, or two or more units may be integrated into one unit. When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: various mediums that can store program code, such as a USB flash drive, a removable hard disk, a read-only memory (ROM), a random access memory (RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
    determining, by a terminal device, a compensation power of an uplink control channel based on first information and a bit per resource element (BPRE) corresponding to uplink control information, wherein the uplink control channel is used to carry uplink control information, wherein the first information is associated with a first parameter set, wherein the first parameter set is one of at least two parameter sets, each of the at least two parameter sets comprising at least one of the following: a channel coding type of the uplink control information, a transmission format of the uplink control channel, or a length of a check code bit of the uplink control information, and wherein there is a mapping relationship between the at least two parameter sets and at least two compensation coefficient sets, each compensation coefficient set including at least one of a value of compensation coefficient $k_1$ or a value of compensation coefficient $k_2$, $k_1$ and $k_2$ are greater than or equal to 0, and the compensation power meets the following formula:
    $\Delta_{TF}=10\ \log_{10}[f(k_1 \cdot T, k_2)]$, where $\Delta_{TF}$ represents the compensation power, T represents the BPRE corresponding to the uplink control information, the value of $k_1$ and $k_2$ belong to compensation coefficient set corresponding to the first parameter set, and $f(k_1 \cdot T, k_2)$ is a preset function that uses T, $k_1$ and $k_2$ as variables;
    determining, by the terminal device, a transmit power of the uplink control channel based on the compensation power; and
    sending, by the terminal device, the uplink control channel based on the transmit power.

2. The method according to claim 1, wherein the determining, by the terminal device, the transmit power based on the compensation power comprises:
    determining, by the terminal device, the transmit power based on the compensation power and a reference power.

3. The method according to claim 2, wherein the reference power is determined based on an open-loop power value P0, a path loss value PL, a compensation power value $\Delta_{F\text{-}PUCCH}$ of the transmission format of the uplink control channel, and a closed-loop power control value g.

4. The method according to claim 1, wherein $f(k_1 \cdot T, k_2)=k_2 \cdot (2^{k_1 \cdot T}-1)$ or $f(k_1 \cdot T, k_2)=(2^{k_1 \cdot T}-1)^{k_2}$.

5. The method according to claim 1, wherein the value of $k_2$ is equal to 1.

6. The method according to claim 1, wherein the BPRE is a ratio of a quantity of bits of the uplink control information to a quantity of resource elements occupied by the uplink control channel, and wherein the quantity of bits of the uplink control information is a sum of a quantity of information bits of the uplink control information and a quantity of cyclic redundancy check (CRC) bits of the uplink control information.

7. The method according to claim 6, wherein the quantity of CRC bits comprises 0 bits, 6 bits, or 11 bits.

8. The method according to claim 1, wherein the uplink control information comprises at least one of the following: a channel status indication, feedback information, or a scheduling request.

9. The method according to claim 1, wherein the channel coding type is an RM (Reed-Muller) code, a turbo code, or a polar code.

10. An apparatus, comprising:
    at least one processor, configured to:
        determine a compensation power of an uplink control channel based on first information and a bit per resource element (BPRE) corresponding to uplink control information, wherein the uplink control channel is used to carry uplink control information, wherein the first information is associated with a first parameter set, wherein the first parameter set is one of at least two parameter sets, each of the at least two parameter sets comprising at least one of the following: a channel coding type of the uplink control information, a transmission format of the uplink control channel, or a length of a check code bit of the uplink control information, and wherein there is a mapping relationship between the at least two parameter sets and at least two compensation coefficient sets, each compensation coefficient set including at least one of a value of compensation coefficient $k_1$ or a value of compensation coefficient $k_2$, $k_1$ and $k_2$ are greater than or equal to 0, and the compensation power meets the following formula:
        $\Delta_{TF}=10\ \log_{10}[f(k_1 \cdot T, k_2)]$, where $\Delta_{TF}$ represents the compensation power, T represents the BPRE corresponding to the uplink control information, the value of $k_1$ and $k_2$ belong to compensation coefficient set corresponding to the first parameter set, and $f(k_1 \cdot T, k_2)$ is a preset function that uses T, $k_1$ and $k_2$ as variables; and
        determine a transmit power of the uplink control channel based on the compensation power; and
    a transceiver, configured to send the uplink control channel based on the transmit power.

11. The apparatus according to claim 10, wherein the at least one processor is configured to:

determine the transmit power based on the compensation power and a reference power.

12. The apparatus according to claim 11, wherein the reference power is determined based on an open-loop power value P0, a path loss value PL, a compensation power value $\Delta_{F\text{-}PUCCH}$ of the transmission format of the uplink control channel, and a closed-loop power control value g.

13. The apparatus according to claim 10, wherein $f(k_1 \cdot T, k_2) = k_2 \cdot (2^{k_1 \cdot T} - 1)$ or $f(k_1 \cdot T, k_2) = (2^{k_1 \cdot T} - 1)^{k_2}$.

14. The apparatus according to claim 10, wherein the value of $k_2$ is equal to 1.

15. The apparatus according to claim 10, wherein the BPRE is a ratio of a quantity of bits of the uplink control information to a quantity of resource elements occupied by the uplink control channel, and wherein the quantity of bits of the uplink control information is a sum of a quantity of information bits of the uplink control information and a quantity of cyclic redundancy check (CRC) bits of the uplink control information.

16. The apparatus according to claim 15, wherein the quantity of CRC bits comprises 0 bits, 6 bits, or 11 bits.

17. The apparatus according to claim 10, wherein the uplink control information comprises at least one of the following: a channel status indication, feedback information, or a scheduling request.

18. The apparatus according to claim 10, wherein the channel coding type is an RM (Reed-Muller) code, a turbo code, or a polar code.

19. A non-transitory computer readable storage medium having instructions stored thereon, which when the instructions are executed by at least one processor, cause the at least one processor to implement:

determining a compensation power of an uplink control channel based on first information and a bit per resource element (BPRE) corresponding to uplink control information, wherein the uplink control channel is used to carry the uplink control information, wherein the first information is associated with a first parameter set, wherein the first parameter set is one of at least two parameter sets, each of the at least two parameter sets comprising at least one of the following: a channel coding type of the uplink control information, a transmission format of the uplink control channel, or a length of a check code bit of the uplink control information, and wherein there is a mapping relationship between the at least two parameter sets and at least two compensation coefficient sets, each compensation coefficient set including at least one of a value of compensation coefficient $k_1$ or a value of compensation coefficient $k_2$, $k_1$ and $k_2$ are greater than or equal to 0, and the compensation power meets the following formula:
$\Delta_{TF} = 10 \log_{10}[f(k_1 \cdot T, k_2)]$, where $\Delta_{TF}$ represents the compensation power, T represents the BPRE corresponding to the uplink control information, the value of $k_1$ and $k_2$ belong to compensation coefficient set corresponding to the first parameter set, and $f(k_1 \cdot T, k_2)$ is a preset function that uses T, $k_1$ and $k_2$ as variables;

determining a transmit power of the uplink control channel based on the compensation power; and sending the uplink control channel based on the transmit power.

20. The non-transitory computer readable storage medium according to claim 19, wherein determining the transmit power based on the compensation power comprises:
determining the transmit power based on the compensation power and a reference power.

21. The non-transitory computer readable storage medium according to claim 20, wherein the reference power is determined based on an open-loop power value P0, a path loss value PL, a compensation power value $\Delta_{F\text{-}PUCCH}$ of the transmission format of the uplink control channel, and a closed-loop power control value g.

22. The non-transitory computer readable storage medium according to claim 19, wherein $f(k_1 \cdot T, k_2) = k_2 \cdot (2^{k_1 \cdot T} - 1)$ or $f(k_1 \cdot T, k_2) = (2^{k_1 \cdot T} - 1)^{k_2}$.

23. The non-transitory computer readable storage medium according to claim 19, wherein the value of $k_2$ is equal to 1.

24. The non-transitory computer readable storage medium according to claim 19, wherein the BPRE is a ratio of a quantity of bits of the uplink control information to a quantity of resource elements occupied by the uplink control channel, and wherein the quantity of bits of the uplink control information is a sum of a quantity of information bits of the uplink control information and a quantity of cyclic redundancy check (CRC) bits of the uplink control information.

25. The non-transitory computer readable storage medium according to claim 24, wherein the quantity of CRC bits comprises 0 bits, 6 bits, or 11 bits.

26. The non-transitory computer readable storage medium according to claim 19, wherein the uplink control information comprises at least one of the following: a channel status indication, feedback information, or a scheduling request.

27. The non-transitory computer readable storage medium according to claim 19, wherein the channel coding type is an RM (Reed-Muller) code, a turbo code, or a polar code.

* * * * *